US012556997B2

(12) United States Patent
Luo et al.

(10) Patent No.: US 12,556,997 B2
(45) Date of Patent: Feb. 17, 2026

(54) CELL SELECTION METHOD AND APPARATUS

(71) Applicant: HUAWEI TECHNOLOGIES CO., LTD., Guangdong (CN)

(72) Inventors: Hejia Luo, Hangzhou (CN); Xiaolu Wang, Hangzhou (CN); Rong Li, Hangzhou (CN); Jianglei Ma, Ottawa (CA); Jun Wang, Hangzhou (CN)

(73) Assignee: Huawei Technologies Co., LTD., Shenzhen (CN)

( * ) Notice: Subject to any disclaimer, the term of this patent is extended or adjusted under 35 U.S.C. 154(b) by 442 days.

(21) Appl. No.: 18/343,486

(22) Filed: Jun. 28, 2023

(65) Prior Publication Data

US 2023/0345338 A1 Oct. 26, 2023

Related U.S. Application Data

(63) Continuation of application No. PCT/CN2021/141780, filed on Dec. 27, 2021.

(30) Foreign Application Priority Data

Dec. 30, 2020 (CN) .......................... 202011614884.1

(51) Int. Cl.
*H04L 12/50* (2006.01)
*H04W 36/00* (2009.01)
(Continued)

(52) U.S. Cl.
CPC ..... *H04W 36/304* (2023.05); *H04W 36/0058* (2018.08); *H04W 36/00835* (2018.08); *H04W 48/20* (2013.01); *H04W 36/083* (2023.05)

(58) Field of Classification Search
CPC ........... H04W 36/304; H04W 36/0058; H04W 36/00835; H04W 48/20; H04W 36/083;
(Continued)

(56) References Cited

U.S. PATENT DOCUMENTS 10,405,280 B2 * 9/2019 Mackenzie ........... H04W 24/10
11,902,815 B2 * 2/2024 Hong .................... H04W 48/16
(Continued)

FOREIGN PATENT DOCUMENTS

| CN | 111757411 A | 10/2020 |
| CN | 111800830 A | 10/2020 |
| CN | 112153706 A | 12/2020 |

OTHER PUBLICATIONS

Huawei et al., "Discussion on cell reselection in NTN," 3GPP TSG RAN WG2 #113-e, R2-2101000, Online, Jan. 25 Feb. 5, 2021, 3 pages.

(Continued)

*Primary Examiner* — Amancio Gonzalez
(74) *Attorney, Agent, or Firm* — Fish & Richardson P.C.

(57) ABSTRACT

This application relates to a cell selection method and apparatus. In an example method, a terminal device performs measurement based on measurement configuration information of N cells and determines M candidate cells based on a measurement result. N is an integer greater than 0, and M is an integer greater than 0 and less than N. The example method further includes the terminal device selecting a target cell from the M candidate cells based on first information. The first information includes coverage information of at least one candidate cell in the M candidate cells.

20 Claims, 12 Drawing Sheets

FIG. 7

(51) Int. Cl.
*H04W 36/30* (2009.01)
*H04W 48/20* (2009.01)
*H04W 36/08* (2009.01)

(58) Field of Classification Search
CPC ............ H04W 36/0085; H04W 36/36; H04W 36/0061; H04W 84/06
USPC ........................................................ 370/332
See application file for complete search history.

(56) References Cited

U.S. PATENT DOCUMENTS

| | | | | |
|---|---|---|---|---|
| 11,997,710 | B2* | 5/2024 | Gao | H04W 48/12 |
| 12,101,669 | B2* | 9/2024 | Wang | H04L 5/001 |
| 2022/0353714 | A1* | 11/2022 | Fu | H04B 7/1853 |
| 2023/0362778 | A1* | 11/2023 | Wu | H04W 36/08 |

OTHER PUBLICATIONS

3GPP TR 38.821 V16.0.0, "3rd Generation Partnership Project; Technical Specification Group Radio Access Network; Solutions for NR to support non-terrestrial networks (NTN) (Release 16)," Dec. 2019, 140 pages.
3GPP TS 38.304 V16.2.0, "3rd Generation Partnership Project; Technical Specification Group Radio Access Network; NR; User Equipment (UE) procedures in Idle mode and RRC Inactive state (Release 16)," Sep. 2020, 39 pages.
International Search Report and Written Opinion in International Appln. No. PCT/CN2021/141780, mailed on Mar. 17, 2022, 20 pages (with English translation).

* cited by examiner

CELL SELECTION METHOD AND APPARATUS

CROSS-REFERENCE TO RELATED APPLICATIONS

This application is a continuation of International Application No. PCT/CN2021/141780, filed on Dec. 27, 2021, which claims priority to Chinese Patent Application No. 202011614884.1, filed on Dec. 30, 2020. The disclosures of the aforementioned applications are hereby incorporated by reference in their entireties.

TECHNICAL FIELD

The present invention relates to the field of communication technologies, and in particular, to a cell selection method and apparatus.

BACKGROUND

A non-terrestrial network (NTN) includes networking by using devices such as an uncrewed aerial vehicle, a high altitude platform station, and a satellite, to provide services such as data transmission and voice communication for user equipment (UE). NTN communication is characterized by wide coverage and a long latency, and is different from a common ground base station signal. Such a difference greatly affects services for user equipment (UE), and further affects a decision such as cell reselection. For example, when a service type of UE is a latency-sensitive communication service, the UE may select a cell for which a satellite provides coverage. As the satellite is highly mobile, the UE frequently performs satellite beam handover due to satellite movement, and consequently frequently re-obtains system information, frequently updates measurement handover-related configuration, and the like, resulting in excessive power consumption and large overheads.

SUMMARY

This application provides a cell selection method and apparatus, to resolve problems of excessive power consumption and large overheads caused by frequent satellite beam handover performed by UE.

According to a first aspect, an embodiment of this application provides a cell selection method, including the following steps: A terminal device performs measurement based on measurement configuration information of N cells, and determines M candidate cells based on a measurement result. N is an integer greater than 0, and M is an integer greater than 0 and less than N. The terminal device selects a target cell from the M candidate cells based on first information. The first information includes coverage information of at least one candidate cell in the M candidate cells, coverage information of an $i^{th}$ candidate cell in the at least one candidate cell includes coverage time information of the $i^{th}$ candidate cell covering a first geographical region and coverage time information of a network device corresponding to the first candidate cell covering the first geographical region, the terminal device is located in the first geographical region, i={1, 2, ..., I}, and I is a quantity of candidate cells in the at least one candidate cell.

In this embodiment of this application, when cell reselection is performed, based on coverage time of a cell and coverage time of a network device corresponding to the cell, a cell with long coverage time in cells of the network device with long coverage time can be preferentially selected based on the coverage time of the cell and the coverage time of the network device, thereby reducing a frequency of network handover. In addition, in this embodiment of this application, considering that different cells covered by a same satellite have some same system configuration information or have significant regularity, for example, ephemeris information and a neighboring frequency list, reselection to different cells of the same satellite actually requires less system information overheads for triggering update than reselection to different cells of different satellites. Therefore, a cell of the same satellite can be preferentially selected for cell handover by considering the coverage time of the satellite, thereby reducing system overheads.

In a possible design, when selecting the target cell from the M candidate cells based on the first information, for each candidate cell in the at least one candidate cell, the terminal device may determine remaining coverage duration of the candidate cell based on coverage time information of the candidate cell covering the first geographical region, and determine remaining coverage duration of a network device corresponding to the candidate cell based on coverage time information of the network device corresponding to the candidate cell covering the first geographical region. The terminal device determines a metric value of the candidate cell based on the remaining coverage duration of the candidate cell and the remaining coverage duration of the network device corresponding to the candidate cell. The metric value of the candidate cell indicates time in which the network device corresponding to the candidate cell serves the terminal device. The terminal device determines the target cell based on the metric value of the at least one candidate cell. Through the foregoing design, a frequency of network handover can be reduced.

In a possible design, the metric value of the candidate cell is a weighted sum of the remaining coverage duration of the candidate cell and the remaining coverage duration of the network device corresponding to the candidate cell. Through the foregoing design, by comprehensively considering the remaining coverage duration of the candidate cell and the remaining coverage duration of the network device corresponding to the candidate cell, appropriateness of cell selection can be improved and a frequency of network handover can be reduced.

In a possible design, the metric value of the candidate cell may satisfy the following formula:

$$R = aX + bY.$$

R is a metric value of a candidate cell, X is remaining coverage duration of the candidate cell, Y is remaining coverage duration of a network device corresponding to the candidate cell, and a and b are weighted values.

In a possible design, the terminal device selects a candidate cell with a largest metric value in the M candidate cells as the target cell.

In a possible design, the terminal device may select a candidate cell with a metric value greater than a threshold as the target cell.

In a possible design, if metric values of a plurality of candidate cells are greater than a threshold, the terminal device may select a candidate cell with a largest metric value therefrom as the target cell, or the terminal device may select any candidate cell with a metric value greater than a threshold as the target cell. Alternatively, if metric values of the M candidate cells are all less than a threshold, the terminal device may select a candidate cell with a largest metric value therefrom as the target cell.

In a possible design, the metric value of the candidate cell may satisfy the following formula:

$$R=c/X+d/Y.$$

R is a metric value of a candidate cell, X is remaining coverage duration of the candidate cell, Y is remaining coverage duration of a network device corresponding to the candidate cell, and a and b are weighted values.

In a possible design, the terminal device selects a candidate cell with a smallest metric value in the M candidate cells as the target cell.

In a possible design, the terminal device may select a candidate cell with a metric value less than a threshold as the target cell.

In a possible design, if metric values of a plurality of candidate cells are less than a threshold, the terminal device may select a candidate cell with a smallest metric value therefrom as the target cell, or the terminal device may select any candidate cell with a metric value less than a threshold as the target cell. Alternatively, if metric values of the M candidate cells are all greater than a threshold, the terminal device may select a candidate cell with a smallest metric value therefrom as the target cell.

In a possible design, if the network device corresponding to the candidate cell and a network device corresponding to a serving cell of the terminal device are on a same orbital plane, the metric value of the candidate cell is determined by using a first weighting scheme; or if the network device corresponding to the candidate cell and a network device corresponding to a serving cell of the terminal device are on different orbital planes, the metric value of the candidate cell is determined by using a second weighting scheme. The first weighting scheme satisfies at least one of the following conditions: A weighted value of remaining coverage duration of a cell in the first weighting scheme is greater than a weighted value of the remaining coverage duration of the cell in the second weighting scheme, and a weighted value of remaining coverage duration of a network device corresponding to the cell in the first weighting scheme is greater than a weighted value of the remaining coverage duration of the network device corresponding to the cell in the second weighted scheme. Through the foregoing design, the terminal device can preferentially select cells of satellites on a same orbital plane to perform cell reselection, thereby reducing overheads of reading system information by the terminal device. Alternatively, the first weighting scheme satisfies at least one of the following conditions: A weighted value of remaining coverage duration of a cell in the first weighting scheme is not less than a weighted value of the remaining coverage duration of the cell in the second weighting scheme, and a weighted value of remaining coverage duration of a network device corresponding to the cell in the first weighting scheme is not less than a weighted value of the remaining coverage duration of the network device corresponding to the cell in the second weighted scheme. Through the foregoing design, the terminal device can preferentially select cells of satellites on a same orbital plane to perform cell reselection, thereby reducing overheads of reading system information by the terminal device.

In a possible design, the coverage information of the $i^{th}$ candidate cell includes orbital plane information of the network device corresponding to the $i^{th}$ candidate cell. Through the foregoing design, the terminal device can obtain, based on the coverage information of the $i^{th}$ candidate cell, the orbital plane information of the network device corresponding to the candidate cell.

In a possible design, the coverage information of the $i^{th}$ candidate cell includes coverage time information of all cells of the network device corresponding to the $i^{th}$ candidate cell, coverage time information of a $j^{th}$ cell of the network device includes start time and end time at which the $j^{th}$ cell covers the first geographical region, j={1, 2, . . . , J}, and J is a quantity of the cells of the network device. Through the foregoing design, overheads of the terminal device can be reduced, and exposure of a network deployment status of the network device can be avoided, thereby ensuring network privacy.

In a possible design, the coverage information of the $i^{th}$ candidate cell includes the coverage time information of the $i^{th}$ candidate cell and the coverage time information of the network device corresponding to the $i^{th}$ candidate cell, the coverage time information of the $i^{th}$ candidate cell includes start time and end time at which the $i^{th}$ candidate cell covers the first geographical region, and the coverage time information of the network device includes start time and end time at which the network device covers the first geographical region. Through the foregoing design, overheads of the terminal device can be reduced, and exposure of a network deployment status of the network device can be avoided, thereby ensuring network privacy.

In a possible design, the coverage information of the $i^{th}$ candidate cell includes a moving speed and a moving direction of the network device corresponding to the $i^{th}$ candidate cell, a coverage parameter of the $i^{th}$ candidate cell, and a coverage parameter of the network device. The coverage parameter of the $i^{th}$ candidate cell indicates a coverage region of the $i^{th}$ candidate cell, and the coverage parameter of the network device indicates a coverage region of the network device. Through the foregoing design, the terminal device can determine the coverage time information of the cell based on the moving speed and the moving direction of the network device, the coverage region of the cell, and the geographical location of the terminal device, and determine the coverage time information of the network device based on the moving speed and the moving direction of the network device, the coverage region of the network device, and the geographical location of the terminal device.

In a possible design, the coverage information of the $i^{th}$ candidate cell includes a moving speed and a moving direction of the network device corresponding to the $i^{th}$ candidate cell, and coverage parameters of all cells of the network device corresponding to the $i^{th}$ candidate cell. A coverage parameter of a $j^{th}$ cell of the network device indicates a coverage region of the $j^{th}$ cell, j={1, 2, . . . , J}, and J is a quantity of the cells of the network device. Through the foregoing design, the terminal device can determine the coverage time information of each cell based on the moving speed and the moving direction of the network device, the coverage region of each cell, and the geographical location of the terminal device, and determine the coverage time information of the network device based on the coverage time information of each cell of the network device.

In a possible design, the coverage parameter of the $i^{th}$ candidate cell includes central coordinates and a coverage radius of the $i^{th}$ candidate cell. Alternatively, the coverage parameter of the $i^{th}$ candidate cell includes central coordinates, a major axis radius, and a minor axis radius of the $i^{th}$ candidate cell. Alternatively, the coverage parameter of the $i^{th}$ candidate cell includes a side length of the $i^{th}$ candidate cell. Alternatively, the coverage parameter of the $i^{th}$ candidate cell includes a reference direction of the $i^{th}$ candidate cell relative to the network device corresponding to the $i^{th}$ candidate cell, and a maximum communicable expansion angle in the reference direction. Through the foregoing design, the coverage region of the $i^{th}$ candidate cell can be determined.

In a possible design, the coverage parameter of the network device includes central coordinates and a coverage radius of the network device, or the coverage parameter of the network device includes central coordinates, a major axis radius, and a minor axis radius of the network device, or the coverage parameter of the network device includes a side length of the network device. Through the foregoing design, the coverage region of the network device can be determined.

In a possible design, the coverage parameter of the $j^{th}$ cell includes central coordinates and a coverage radius of the $j^{th}$ cell, or the coverage parameter of the $j^{th}$ cell includes central coordinates, a major axis radius, and a minor axis radius of the $j^{th}$ cell, or the coverage parameter of the $j^{th}$ cell includes a side length of the $j^{th}$ cell, or the coverage parameter of the $j^{th}$ cell includes a reference direction of the $j^{th}$ cell relative to the network device corresponding to the $i^{th}$ candidate cell, and a maximum communicable expansion angle in the reference direction. Through the foregoing design, the coverage region of each cell can be determined.

In a possible design, the terminal device may receive the first information from the serving cell before the terminal device performs measurement based on the measurement configuration information of the N cells. In the foregoing design, the network device corresponding to the serving cell of the terminal device can send the first information to the terminal device before cell measurement, so that the first information can be sent through terminal device-level radio resource control (RRC) configuration, and there is little broadcast signaling. Therefore, overheads of the network device can be reduced.

In a possible design, the terminal device may receive the first information from the $i^{th}$ candidate cell in the M candidate cells after the terminal device determines the M candidate cells based on the measurement result. In the foregoing design, the terminal device obtains the first information from the candidate cell only when determining to camp on a cell. In this manner, configuration information that needs to be stored by the terminal device can be reduced, thereby reducing storage overheads of the terminal device. In addition, in this manner, a real-time status of a network can be reflected more accurately.

In a possible design, the terminal device may receive H pieces of cell information from the serving cell before the terminal device performs measurement based on the measurement configuration information of the N cells. Each piece of cell information includes coverage information of at least one cell and information about an effective condition corresponding to the cell information, and H is an integer greater than 0. The terminal device selects to-be-used cell information based on information about effective conditions of the H pieces of cell information. The cell information includes the first information. Through the foregoing design, overheads generated when the terminal device in a non-connected state frequently wakes up to read system information can be reduced, and high-layer signaling overheads consumed by the terminal device in a connected state due to frequent update of measurement handover-related configuration can be reduced.

In a possible design, the effective condition is an effective time period. Through the foregoing design, the terminal device can determine the to-be-used cell information based on the current time and the effective time period corresponding to each piece of cell information.

In a possible design, the terminal device may receive T pieces of cell information and an effective rule from the serving cell before the terminal device performs measurement based on the measurement configuration information of the N cells. The effective rule indicates a rule of start effective time among the T pieces of cell information, and T is an integer greater than 0. The terminal device determines the start effective time of the T pieces of cell information based on the effective rule. The terminal device selects to-be-used cell information based on the start effective time of the T pieces of cell information. The cell information includes the first information. In this manner, signaling overheads can be reduced.

According to a second aspect, an embodiment of this application provides a cell selection method, including the following steps: A network device determines first information. The first information includes coverage information of at least one cell. Coverage information of a $k^{th}$ cell in the at least one cell includes coverage time information of the $k^{th}$ cell covering a first geographical region and coverage time information of a network device corresponding to the $k^{th}$ cell covering the first geographical region. The network device sends the first information to a terminal device. In the foregoing description, $k=\{1, 2, \ldots, K\}$, and K is a quantity of cells in the at least one cell.

In this embodiment of this application, when cell reselection is performed, based on coverage time of a cell and coverage time of a network device corresponding to the cell, a cell with long coverage time in cells of the network device with long coverage time can be preferentially selected based on the coverage time of the cell and the coverage time of the network device, thereby reducing a frequency of network handover. In addition, in this embodiment of this application, considering that different cells covered by a same satellite have some same system configuration information or have significant regularity, for example, ephemeris information and a neighboring frequency list, reselection to different cells of the same satellite actually requires less system information overheads for triggering update than reselection to different cells of different satellites. Therefore, a cell of the same satellite can be preferentially selected for cell handover by considering the coverage time of the satellite, thereby reducing system overheads.

In a possible design, coverage information of a first cell further indicates orbital plane information of a network device corresponding to the first cell. Through the foregoing design, the terminal device can obtain, based on the coverage information of the $k^{th}$ cell, the orbital plane information of the network device corresponding to the candidate cell.

In a possible design, the coverage information of the $k^{th}$ cell includes coverage time information of all cells of the network device corresponding to the $k^{th}$ cell, coverage time information of an $h^{th}$ cell of the network device includes start time and end time at which the $h^{th}$ cell covers the first geographical region, $h=\{1, 2, \ldots, H\}$, and H is a quantity of the cells covered by the network device. Through the foregoing design, overheads of the terminal device can be reduced, and exposure of a network deployment status of the network device can be avoided, thereby ensuring network privacy.

In a possible design, the coverage information of the $k^{th}$ cell includes the coverage time information of the $k^{th}$ cell and the coverage time information of the network device corresponding to the $k^{th}$ cell, the coverage time information of the $k^{th}$ cell includes start time and end time at which the $k^{th}$ cell covers the first geographical region, and the coverage time information of the network device includes start time and end time at which the network device covers the first geographical region. Through the foregoing design, overheads of the terminal device can be reduced, and exposure of a network deployment status of the network device can be avoided, thereby ensuring network privacy.

In a possible design, the coverage information of the $k^{th}$ cell includes a moving speed and a moving direction of the network device corresponding to the $k^{th}$ cell, a coverage parameter of the $k^{th}$ cell, and a coverage parameter of the network device. The coverage parameter of the $k^{th}$ cell indicates a coverage region of the $k^{th}$ cell. The coverage parameter of the network device indicates a coverage region of the network device. Through the foregoing design, the terminal device can determine the coverage time information of the cell based on the moving speed and the moving direction of the network device, the coverage region of the cell, and the geographical location of the terminal device, and determine the coverage time information of the network device based on the moving speed and the moving direction of the network device, the coverage region of the network device, and the geographical location of the terminal device.

In a possible design, the coverage information of the $k^{th}$ cell includes a moving speed and a moving direction of the network device corresponding to the $k^{th}$ cell, and coverage parameters of all cells of the network device corresponding to the $k^{th}$ cell. A coverage parameter of the $h^{th}$ cell of the network device indicates a coverage region of the $h^{th}$ cell, h={1, 2, . . . , H}, and H is a quantity of the cells covered by the network device. Through the foregoing design, the terminal device can determine the coverage time information of the cell based on the moving speed and the moving direction of the network device, the coverage region of the cell, and the geographical location of the terminal device, and determine the coverage time information of the network device based on the moving speed and the moving direction of the network device, the coverage region of the network device, and the geographical location of the terminal device.

In a possible design, the coverage parameter of the $k^{th}$ cell includes central coordinates and a coverage radius of the $k^{th}$ cell. Alternatively, the coverage parameter of the $k^{th}$ cell includes central coordinates, a major axis radius, and a minor axis radius of the $k^{th}$ cell. Alternatively, the coverage parameter of the $k^{th}$ cell includes a side length of the $k^{th}$ cell. Alternatively, the coverage parameter of the $k^{th}$ cell includes a reference direction of the $k^{th}$ cell relative to the network device corresponding to the $k^{th}$ cell, and a maximum communicable expansion angle in the reference direction. Through the foregoing design, the coverage region of the $k^{th}$ cell can be determined.

In a possible design, the coverage parameter of the network device includes central coordinates and a coverage radius of the network device, or the coverage parameter of the network device includes central coordinates, a major axis radius, and a minor axis radius of the network device, or the coverage parameter of the network device includes a side length of the network device. Through the foregoing design, the coverage region of the network device can be determined.

In a possible design, the coverage parameter of each cell includes central coordinates and a coverage radius of each cell, or the coverage parameter of each cell includes central coordinates, a major axis radius, and a minor axis radius of each cell, or the coverage parameter of each cell includes a side length of each cell, or the coverage parameter of each cell includes a reference direction of each cell relative to the network device corresponding to the $k^{th}$ cell, and a maximum communicable expansion angle in the reference direction. Through the foregoing design, the coverage region of each cell can be determined.

In a possible design, when sending the first information to the terminal device, the network device may send H pieces of cell information to the terminal device. Each piece of cell information includes coverage information of at least one cell and information about an effective condition corresponding to the cell information, H is an integer greater than 0, and the first information is one of the H pieces of cell information. Through the foregoing design, overheads generated when the terminal device in a non-connected state frequently wakes up to read system information can be reduced, and high-layer signaling overheads consumed by the terminal device in a connected state due to frequent update of measurement handover-related configuration can be reduced.

In a possible design, the effective condition is an effective time period. Through the foregoing design, the terminal device can determine the to-be-used cell information based on the current time and the effective time period corresponding to each piece of cell information.

In a possible design, when sending the first information to the terminal device, the network device may send T pieces of cell information and an effective rule to the terminal device. The effective rule indicates a rule of start effective time among the T pieces of cell information, T is an integer greater than 0, and the first information is one of the T pieces of cell information. In this manner, signaling overheads can be reduced.

According to a third aspect, this application provides a communication apparatus. The apparatus may be a terminal device, or may be a chip or a chipset in a terminal device. The apparatus may include a processing unit and a storage unit.

When the apparatus is a terminal device, the processing unit may be a processor, and the storage unit may be a memory. The apparatus may further include a transceiver unit. The transceiver unit is configured to communicate with a network device. The transceiver unit may be a transceiver. The storage unit is configured to store instructions. The processing unit executes the instructions stored in the storage unit, so that the terminal device performs corresponding functions in the first aspect.

When the apparatus is a chip or a chipset in a terminal device, the processing unit may be a processor, and the storage unit may be a storage unit (for example, a register or a cache) inside the chip or the chipset, or may be a storage unit (for example, a read-only memory or a random access memory) outside the chip or the chipset. The apparatus may further include a transceiver unit. The transceiver unit is configured to communicate with a network device. The transceiver unit may be an input/output interface, a pin, a circuit, or the like. The storage unit is configured to store instructions. The processing unit executes the instructions stored in the storage unit, so that the terminal device performs corresponding functions in the first aspect.

According to a fourth aspect, this application provides a communication apparatus. The apparatus may be a network device, or may be a chip or a chipset in a network device. The apparatus may include a processing unit and a transceiver unit.

When the apparatus is a network device, the processing unit may be a processor, and the transceiver unit may be a transceiver. The apparatus may further include a storage unit. The storage unit may be a memory. The storage unit is configured to store instructions. The processing unit executes the instructions stored in the storage unit, so that the network device performs corresponding functions in the second aspect.

When the apparatus is a chip or a chipset in a network device, the processing unit may be a processor, and the transceiver unit may be an input/output interface, a pin, a circuit, or the like. The apparatus may further include a storage unit. The storage module may be a storage module (for example, a register or a cache) inside the chip or the chipset, or may be a storage module (for example, a read-only memory or a random access memory) outside the chip or the chipset. The storage unit is configured to store instructions. The processing unit executes the instructions stored in the storage unit, so that the network device performs corresponding functions in the second aspect.

According to a fifth aspect, an embodiment of this application provides a communication apparatus. The apparatus includes a communication interface and a processor. The communication interface is configured for communication between the apparatus and another device, for example, data or signal receiving and sending. For example, the communication interface may be a transceiver, a circuit, a bus, a module, or another type of interface, and the another device may be a network device. The processor is configured to call a group of programs, instructions, or data, to perform the method described in the first aspect or the possible designs of the first aspect. The apparatus may further include a memory, configured to store a program, instructions, or data called by the processor. The memory is coupled to the processor. When executing the instructions or the data stored in the memory, the processor may implement the method described in the first aspect or the possible designs of the first aspect.

According to a sixth aspect, an embodiment of this application provides a communication apparatus. The apparatus includes a communication interface and a processor. The communication interface is configured for communication between the apparatus and another device, for example, data or signal receiving and sending. For example, the communication interface may be a transceiver, a circuit, a bus, a module, or another type of interface, and the another device may be a terminal device. The processor is configured to call a group of programs, instructions, or data, to perform the method described in the second aspect or the possible designs of the second aspect. The apparatus may further include a memory, configured to store a program, instructions, or data called by the processor. The memory is coupled to the processor. When executing the instructions or the data stored in the memory, the processor may implement the method described in the second aspect or the possible designs of the second aspect.

According to a seventh aspect, an embodiment of this application further provides a computer-readable storage medium. The computer-readable storage medium stores computer-readable instructions. When the computer-readable instructions are run on a computer, the method according to any one of the first aspect and the second aspect and the possible designs is performed.

According to an eighth aspect, an embodiment of this application provides a chip system. The chip system includes a processor, and may further include a memory, to implement the method in any one of the first aspect and the second aspect and the possible designs. The chip system may include a chip, or may include a chip and other discrete components.

According to a ninth aspect, an embodiment of this application provides a communication system. The system includes a network device and a terminal device. The terminal device is configured to perform the method in the first aspect or the possible designs of the first aspect. The network device is configured to perform the method in the second aspect or the possible designs of the second aspect.

According to a tenth aspect, a computer program product including instructions is provided. When the computer program product is run on a computer, the method according to the first aspect or the second aspect, and the possible designs is performed.

According to an eleventh aspect, an embodiment of this application provides a communication apparatus. The communication apparatus includes a processor, a memory, and a transceiver. The transceiver is configured to receive a signal or send a signal. The memory is configured to store program code or instructions. The processor is configured to call the program code or the instructions from the memory to perform the method according to the first aspect.

According to a twelfth aspect, an embodiment of this application provides a communication apparatus. The communication apparatus includes a processor, a memory, and a communication interface. The communication interface is configured to receive a signal or send a signal. The memory is configured to store program code or instructions. The processor is configured to call the program code or the instructions from the memory to perform the method according to the second aspect.

According to a thirteenth aspect, an embodiment of this application provides a communication apparatus. The communication apparatus includes a processor and an interface circuit. The interface circuit is configured to receive computer program code or instructions and transmit the computer program code or instructions to the processor. The processor runs the computer program code or the instructions to perform the corresponding method according to the first aspect.

According to a fourteenth aspect, an embodiment of this application provides a communication apparatus. The communication apparatus includes a processor and an interface circuit. The interface circuit is configured to receive computer program code or instructions and transmit the computer program code or instructions to the processor. The processor runs the computer program code or the instructions to perform the corresponding method according to the second aspect.

According to a fifteenth aspect, an embodiment of this application provides a communication apparatus. For example, the communication apparatus may be a chip. The communication apparatus includes: a logic circuit and an input/output interface. The input/output interface is configured for the apparatus to communicate with a network device, for example, receive first information. The logic circuit is configured to run computer program code or instructions to perform the corresponding method according to the first aspect.

According to a sixteenth aspect, an embodiment of this application provides a communication apparatus. For example, the communication apparatus may be a chip. The communication apparatus includes: a logic circuit and an input/output interface. The input/output interface is configured for the apparatus to communicate with a terminal device, for example, send first information. The logic circuit is configured to run computer program code or instructions to perform the corresponding method according to the second aspect.

For technical effects brought by any implementation in the third aspect to the sixteenth aspect, refer to beneficial effects in the corresponding method provided above. Details are not described herein again.

DESCRIPTION OF EMBODIMENTS

Figure 1:
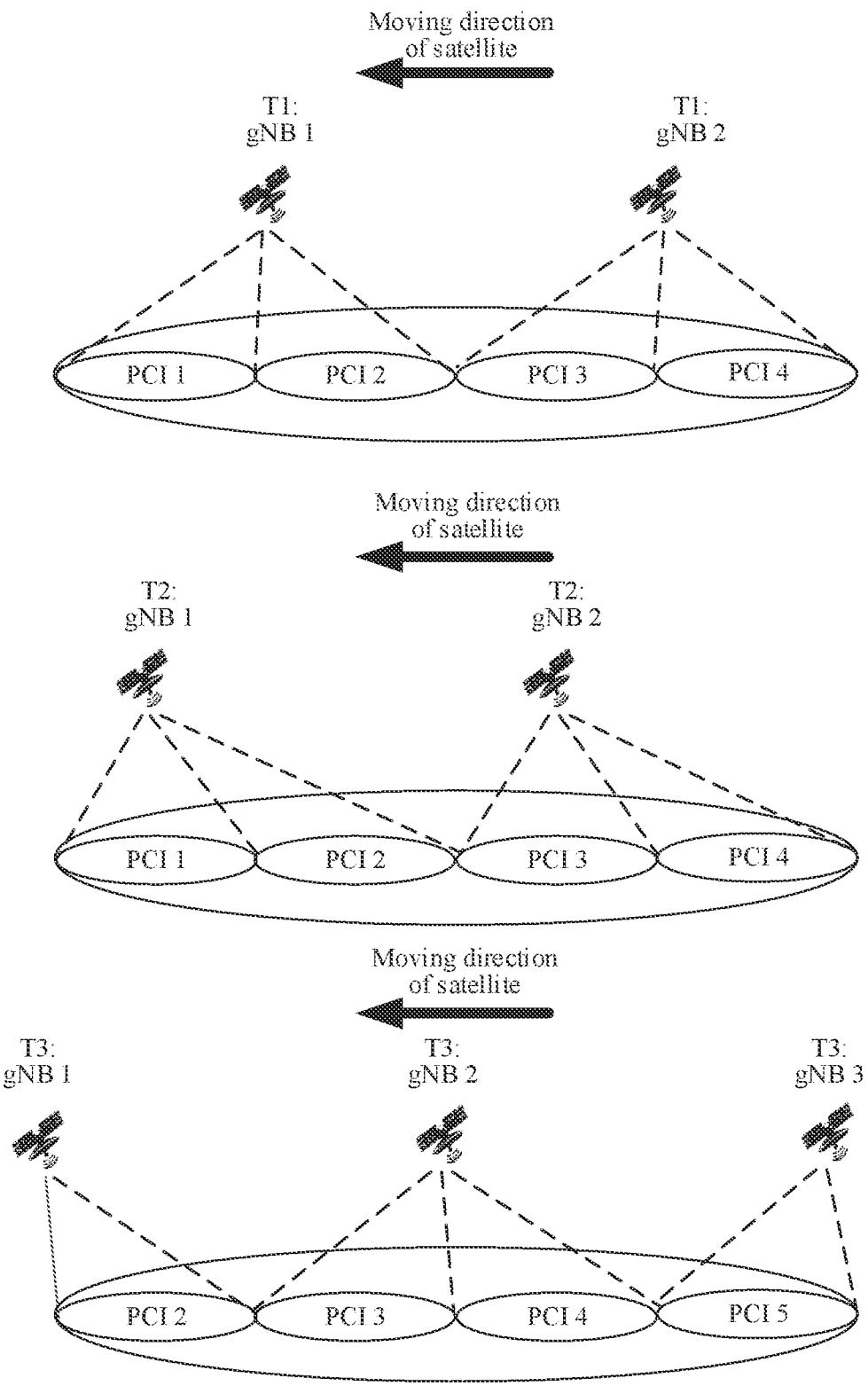
FIG. 1 is a schematic diagram of a fixed cell according to an embodiment of this application.

The following describes some terms in this application, to facilitate understanding of a person skilled in the art.
1. Cell Reselection Cell reselection refers to a process in which a terminal device in an idle mode selects an optimal cell to provide a service signal by monitoring signal quality of a neighboring cell and a current serving cell.

The process of cell reselection may include the following steps:

A1. A terminal device measures a current serving cell and a neighboring cell (including intra-frequency, inter-frequency, and inter-system cells) according to a measurement start criterion.

Measurement start criterion: Two parameters can be considered to determine whether to start measurement of a neighboring cell: cell priority of the neighboring cell and signal quality of a current serving cell. If the cell priority of the neighboring cell is higher than that of the current serving cell, the terminal device unconditionally starts measurement of the neighboring cell. If the cell priority of the neighboring cell is lower than or equal to that of the current serving cell, the terminal device may measure the signal quality of the current serving cell, and compare the signal quality of the current serving cell with a quality threshold. If the signal quality of the current serving cell is higher than the quality threshold, the neighboring cell may not be measured. If the signal quality of the current serving cell is not higher than the quality threshold, the neighboring cell is measured.

A2. The terminal device determines whether a signal of the neighboring cell satisfies a reselection criterion.

Optionally, an inter-frequency and inter-system reselection criterion with different priorities is as follows:

If a cell priority of an inter-frequency/system (inter radio access technology, inter-RAT) neighboring cell is higher than a cell priority of a current serving cell, and if the current serving cell includes threshServingLowQ in system information (SIB2), where threshServingLowQ is a reselection threshold corresponding to a neighboring cell with a lower cell priority than that of the current serving cell, reselection is triggered when the following conditions are satisfied: Time for the terminal device camping on the current serving cell exceeds preset duration (for example, 1 second); and the neighboring cell satisfies Squal>Thresh$_{X, HighQ}$ within a time interval ($T_{reselectionRAT}$). Squal indicates signal quality, and Thresh$_{X, HighQ}$ indicates a threshold of the signal quality.

If the serving cell does not include threshServingLowQ in the system information (SIB2), reselection is triggered when the following conditions are satisfied: The neighboring cell satisfies Srxlev>Thresh$_{X, HighP}$ within a time interval ($T_{reselectionRAT}$). Srxlev indicates signal energy, and Thresh$_{X, HighP}$ indicates a threshold of the signal energy; and time for the terminal device camping on the current serving cell exceeds preset duration (for example, 1 second).

Thresh$_{X, HighQ}$ and Thresh$_{X, HighP}$ are reselection thresholds corresponding to a neighboring cell with a higher cell priority than that of the current serving cell. X may represent a frequency, and each frequency has a corresponding threshold. Thresh$_{X, HighQ}$ and Thresh$_{X, HighP}$ of an inter-frequency neighboring cell can be obtained from SIB4. Thresh$_{X, HighQ}$ and Thresh$_{X, HighP}$ of an inter-system neighboring cell can be obtained from SIB5.

Optionally, Srxlev and Squal may satisfy the following formula, or Srxlev and Squal may be determined through the following formula:

$$Srxlev = Q_{rxlevmeas} - (Q_{rxlevmin} + Q_{rxlevminoffset}) - P_{compensation} - Qoffset_{temp}; \text{ and}$$

$$Squal = Q_{qualmeas} - (Q_{qualmin} + Q_{qualminoffset}) - Qoffset_{temp}.$$

$Q_{rxlevmeas}$: a measured cell received signal level, that is, reference signal received power (RSRP).

$Q_{rxlevmin}$: a minimum cell received level broadcast in a system information block 1 (SIB1), which can be specified by using the parameter CellSel.QRxLevMin.

$Q_{rxlevminoffset}$: an offset value of the minimum cell received level broadcast in SIB1, which can be specified by using the parameter CellSel.QRxLevMinOffset.

$P_{compensation} = \max(P_{Max} - \text{UE Maximum Output Power}, 0)$.

$P_{Max}$: maximum UE transmit power allowed by a cell broadcast in SIB1, which can be specified by using the parameter CELL.UePowerMax. UE Maximum Output Power: a maximum radio frequency output power capability of the UE.

$Q_{qualmeas}$: measured cell received signal quality, that is, reference signal received quality (RSRQ).

$Q_{qualmin}$: a minimum cell received signal quality value broadcast in SIB1, which can be specified by using the parameter CellSel.QQualMin. Whether the parameter $Q_{qualmin}$ is delivered in SIB1 depends on the setting of CellResel.ThrshServLowQCfgInd and CellSel.QQualMin. If CellSel.QQualMin is to set a non-zero value, CellResel.ThrshServLowQCfgInd may be set to "CFG (configure)" or "NOT_CFG (not configure)". This parameter is delivered in SIB1. If CellSel.QQualMin is set to 0, CellResel.ThrshServLowQCfgInd can only be set to "NOT_CFG (not configure)". This parameter is not delivered in SIB1.

$Q_{qualminoffset}$: an offset value of the minimum cell received signal quality broadcast in SIB1, which can be specified by using the parameter CellSel.QQualMinOffset.

For Srxlev and Squal, refer to related descriptions in section 5.2.3.2 of TS 38.304 in the 3GPP protocol. Details are not described herein again.

If a cell priority of an inter-frequency/system (inter radio access technology, inter-RAT) neighboring cell is equal to a cell priority of a current serving cell, the terminal device may perform cell reselection according to an R criterion. The R criterion is to calculate an R (Rank) value for each neighboring cell and a current serving cell based on cell signal quality, and then sort the cells based on the R value. If an R value of a neighboring cell is greater than that of the current serving cell, the neighboring cell satisfies a reselection criterion. If there are a plurality of neighboring cells that satisfy the reselection criterion, an optimal cell is selected. If a neighboring cell always satisfies the R criterion within a time interval (Treselection$_{RAT}$), and time for the terminal device camping on the current serving cell exceeds preset duration (for example, 1 second), the terminal device starts reselection to the neighboring cell.

Optionally, an R value $R_s$ of a serving cell may satisfy the following formula, or an R value $R_s$ of a serving cell may be determined through the following formula:

$$R_s = Q_{meas,s} + Q_{hyst} - Qoffset_{temp}.$$

$Q_{meas,s}$ is signal quality of a current serving cell, and may be obtained through measurement by the terminal device.

$Q_{hyst}$ is a reselection hysteresis value of the current serving cell. A larger $Q_{hyst}$ value indicates a larger boundary of the serving cell and a lower probability of reselection to a neighboring cell.

Qoffset is an R criterion calculation parameter. In an intra-frequency reselection scenario, Qoffset can be equal to Qoffsetcell, and Qoffsetcell can be obtained from SIB3. In an inter-frequency reselection scenario, Qoffset can be equal to a sum of QoffsetCell and QoffsetFreq, and QoffsetCell and QoffsetFreq can be obtained from SIB4.

Qoffset$_{temp}$ is an R criterion calculation parameter, and can be obtained from SIB1.

An R value $R_n$ of a neighboring cell may satisfy the following formula, or an R value $R_n$ of a neighboring cell may be determined through the following formula:

$$R_n = Q_{meas,n} - Qoffset - Qoffset_{temp}.$$

$Q_{meas,n}$ is signal quality of a neighboring cell, and may be obtained through measurement by the terminal device.

For the R value $R_s$ of the serving cell and the R value $R_n$ of the neighboring cell, refer to related descriptions in TS 38.304 of the 3GPP protocol. Details are not described herein again.

If a cell priority of an inter-frequency/system (inter radio access technology, inter-RAT) neighboring cell is lower than a cell priority of a current serving cell, and if the current serving cell includes threshServingLowQ in system information (SIB2), reselection is triggered when the following conditions are satisfied: A neighboring cell with a higher cell priority than that of the serving cell does not satisfy the corresponding reselection criterion; a neighboring cell with a cell priority equal to that of the current serving cell does not satisfy the corresponding reselection criterion; the serving cell satisfies Squal<Thresh$_{Serving, LowQ}$; a neighboring cell satisfies Squal>Thresh$_{X, LowQ}$ within the time interval (Treselection$_{RAT}$); and time for the terminal device camping on the current serving cell exceeds preset duration (for example, 1 second).

If the serving cell does not include threshServingLowQ in the system information (SIB2), reselection is triggered when the following conditions are satisfied: A neighboring cell with a higher cell priority than that of the serving cell does not satisfy the corresponding reselection criterion; a neighboring cell with a cell priority equal to that of the current serving cell does not satisfy the corresponding reselection criterion; the serving cell satisfies Squal<Thresh$_{Serving, LowP}$; a neighboring cell satisfies Squal>Thresh$_{X, LowP}$ within the time interval (Treselection$_{RAT}$); and time for the terminal device camping on the current serving cell exceeds preset duration (for example, 1 second).

Thresh$_{Serving, LowQ}$ and Thresh$_{X, LowQ}$ are reselection thresholds corresponding to a neighboring cell with a lower cell priority than that of the current serving cell. X may represent a frequency, and each frequency has a corresponding threshold. Thresh$_{X, HighP}$ of an inter-frequency neighboring cell can be obtained from SIB4. Thresh$_{X, HighP}$ of an inter-system neighboring cell can be obtained from SIB5.

A3. If the neighboring cell satisfies the reselection criterion, reselection is started. The terminal device receives system information of the neighboring cell. If there is no access restriction (for example, an operator may have some reserved cells or cells with access restrictions), the terminal device camps on the neighboring cell. If the neighboring cell does not satisfy the reselection criterion, the terminal device still stays in the current serving cell.

2. NTN Communication

NTN communication includes networking by using devices such as an uncrewed aerial vehicle, a high altitude platform station (HAPS), and a satellite, to provide services such as data transmission and voice communication for a terminal device. In addition, an NTN system may further include another over-the-air network device. The network device in embodiments of this application is not limited to the foregoing examples.

Based on a satellite height, that is, a satellite orbit height, a satellite system may be classified into a highly elliptical orbit (HEO) satellite, a geostationary earth orbit (GEO) satellite, a medium earth orbit (MEO) satellite, and a low-earth orbit (LEO) satellite.

As an example, mechanisms for providing coverage for cells by a GEO satellite and an LEO satellite are briefly described as follows.

1. GEO satellite: It is also referred to as a geostationary satellite. A moving speed of the satellite is the same as that of an earth rotation system. Therefore, the satellite remains stationary relative to the ground. Correspondingly, cells of the GEO satellite are also stationary. The GEO satellite has a large cell coverage range. Generally, a cell diameter is 500 km.

2. LEO satellite: There are many types of non-stationary satellites. The LEO satellite is used as an example. The LEO satellite moves faster than the ground, about 7 km/s. Therefore, a coverage region in which the LEO satellite provides services also moves correspondingly. There are two modes of cells projected to the ground by the LEO satellite: a fixed cell and a moving cell.

The fixed cell indicates that the cell projected to the ground is fixed relative to the ground. The LEO satellite in the sky can cover the same location on the ground by adjusting an antenna angle. When the LEO satellite cannot cover the ground, another LEO satellite takes over the coverage. As shown in FIG. 1, a mapping manner of fixed cells indicates that locations of the cells are immovable on the ground, and a moving satellite forms these cells by adjusting a beam of the moving satellite. For example, at a moment T1, a region shown in FIG. 1 is covered by a cell 1 and a cell 2 of a gNB 1, and a cell 3 and a cell 4 of a gNB 2. At a moment T2, both the gNB 1 and the gNB 2 move leftward, but their beams can still be adjusted. The region shown in FIG. 1 can still be covered by the cell 1 and the cell 2 of the gNB 1 and the cell 3 and the cell 4 of the gNB 2. At a moment T3, compared with the moment T1, the gNB 1 and the gNB 2 have moved far enough, and the gNB 1 cannot provide services for the region through the cell 1 by adjusting the beam, but a gNB 3 can provide services for the region through a cell 5. The region shown in FIG. 1 can be covered by the cell 2 of the gNB 1, the cell 3 and the cell 4 of the gNB 2, and the cell 5 of the gNB 3. In this cell mode, the satellite may form a fixed cell by adjusting a beam. A beam deployment manner of the satellite may be referred to as a staring beam.

Figure 2:
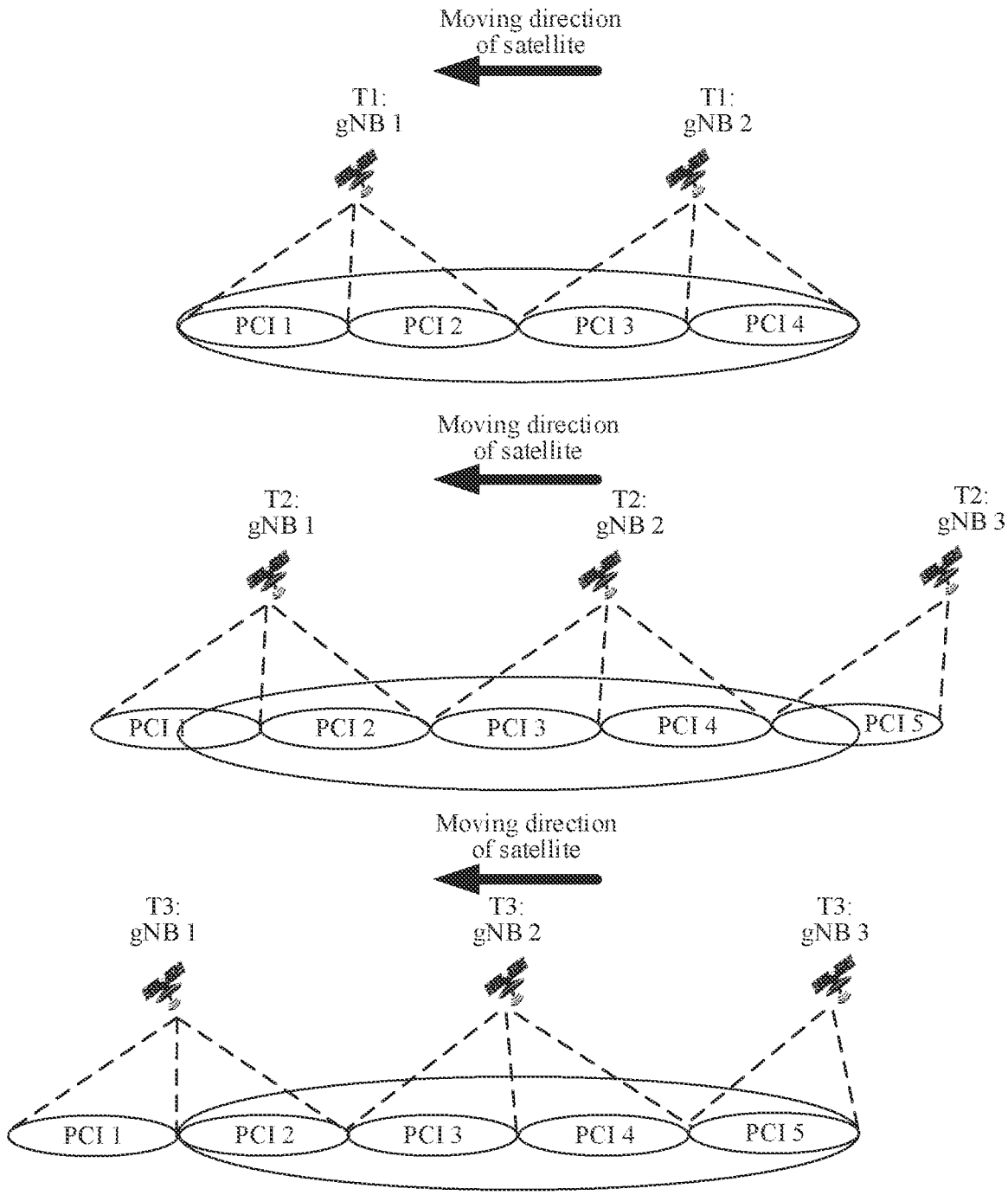
FIG. 2 is a schematic diagram of a moving cell according to an embodiment of this application.

The moving cell indicates that the cell projected to the ground moves along with the LEO satellite. During the moving process, an antenna direction of the LEO satellite remains unchanged. For example, an antenna of the LEO satellite is always perpendicular to the ground. As shown in FIG. 2, a mapping manner of a ground moving cell indicates that a moving satellite does not dynamically adjust a beam direction of the moving satellite, and a beam generated by the moving satellite moves on the ground with the movement of the satellite. For example, at a moment T1, a region shown in FIG. 2 is covered by a cell 1 and a cell 2 of a gNB 1, and a cell 3 and a cell 4 of a gNB 2. At a moment T2, the region shown in FIG. 2 is covered by a part of the cell 1 of the gNB 1, the cell 2 of the gNB 1, the cell 3 and the cell 4 of the gNB 2, and a part of a cell 5 of a gNB 3. At a moment T3, the region is covered by the cell 2 of the gNB 1, the cell 3 and the cell 4 of the gNB 2, and the cell 5 of the gNB 3. In this cell mode, the moving satellite does not dynamically adjust the beam direction of the moving satellite. A beam deployment manner of the satellite may be referred to as a non-staring beam.

Figure 3:
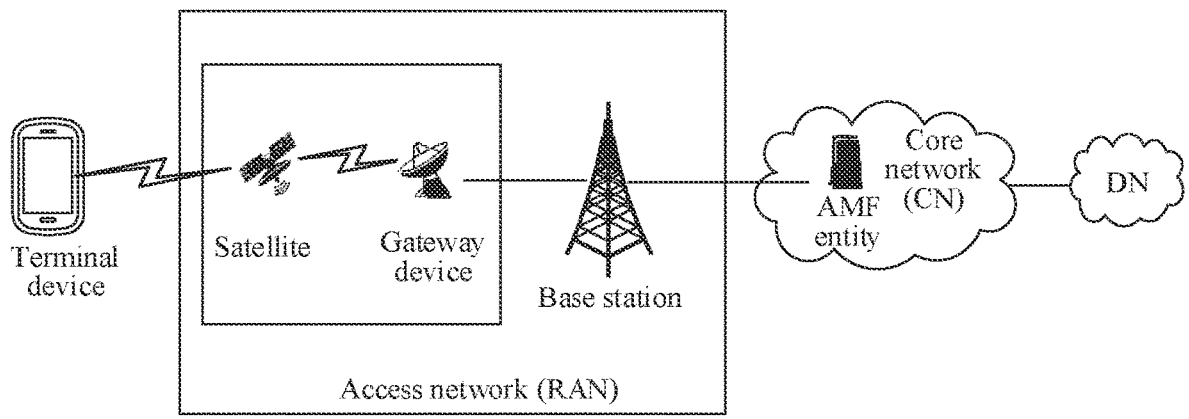
FIG. 3 is a schematic diagram of a transparent architecture according to an embodiment of this application.

In the NTN system, architectures of NTN devices are classified into two types. One is a transparent architecture. In this architecture, the NTN device may be a relay or an amplifier, to perform radio frequency filtering, amplification, and the like, so as to regenerate a signal. For example, an application scenario of the transparent architecture may be shown in FIG. 3. In the application scenario shown in FIG. 3, the NTN device may further be used as a relay device between a terminal device and a base station, or as a remote radio unit (RRU) of a base station. In this scenario, the NTN device may be responsible for layer 1 (L1) relaying for physical layer forwarding and is invisible to higher layers.

Figure 4:
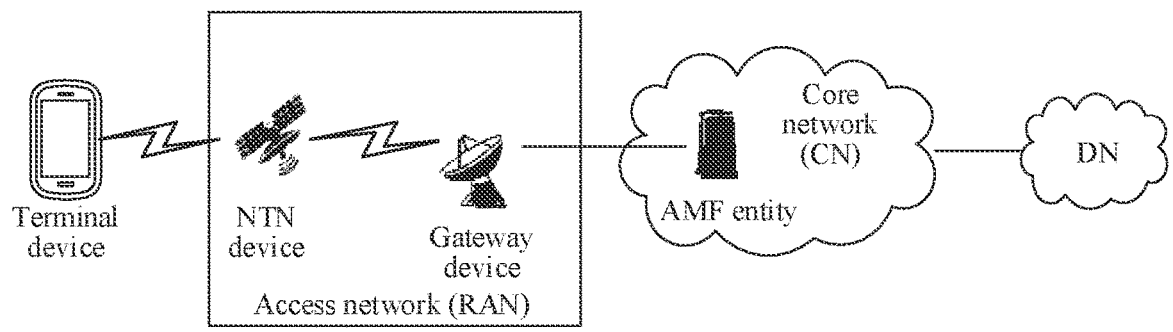
FIG. 4 is a schematic diagram of a regenerative architecture according to an embodiment of this application.

The other is a regenerative architecture. In this architecture, the NTN device may be used as a gNB, a distributed unit (DU), or a relay. The relay herein is different from the relay in the first type, and further has a signal processing function, similar to an integrated access and backhaul (IAB) node or another relay node. When the NTN device is used as a gNB, a DU, an IAB node, or another relay node, a function of the NTN device is similar to that of a common gNB, DU, IAB node, or another relay node. For example, an application scenario of the regenerative architecture may be shown in FIG. 4. In the application scenario shown in FIG. 4, the NTN device may be used as a base station to establish an N2 interface connection or an Ng interface connection to an access and mobility management function (AMF) entity in a core network, to provide a radio access service for a terminal device.

The NTN communication system provides seamless coverage for the terminal device by deploying all or some functions of an access network device on the NTN device (for example, a high altitude platform station or a satellite). Because a non-terrestrial device is less affected by natural disasters, reliability of the communication system can be improved.

3. Communication expansion angle: A beam opening angle is an angle by which a beam deviates from a reference direction (for example, a beam center).

Names of all nodes and messages in this application are merely names set for ease of description, and names in an actual network may be different. It should not be understood that names of various nodes and messages are limited in this application. On the contrary, any name that has a function the same as or similar to that of a node or message used in this application is considered as a method in this application or an equivalent replacement, and falls within the protection scope of this application. Details are not described herein again.

For example, a cell selection method provided in embodiments of this application may be applied to a communication system that includes an NTN device (such as a satellite, an HAPS, or an uncrewed aerial vehicle) and an access network device on the ground. The NTN device may have all or some functions of the access network device. A network architecture of the NTN device may be a transparent architecture, or may be a regenerative architecture. Optionally, the network architecture may further include a gateway device, and the gateway device is configured to forward a signal of a ground base station to a satellite.

Figure 5:
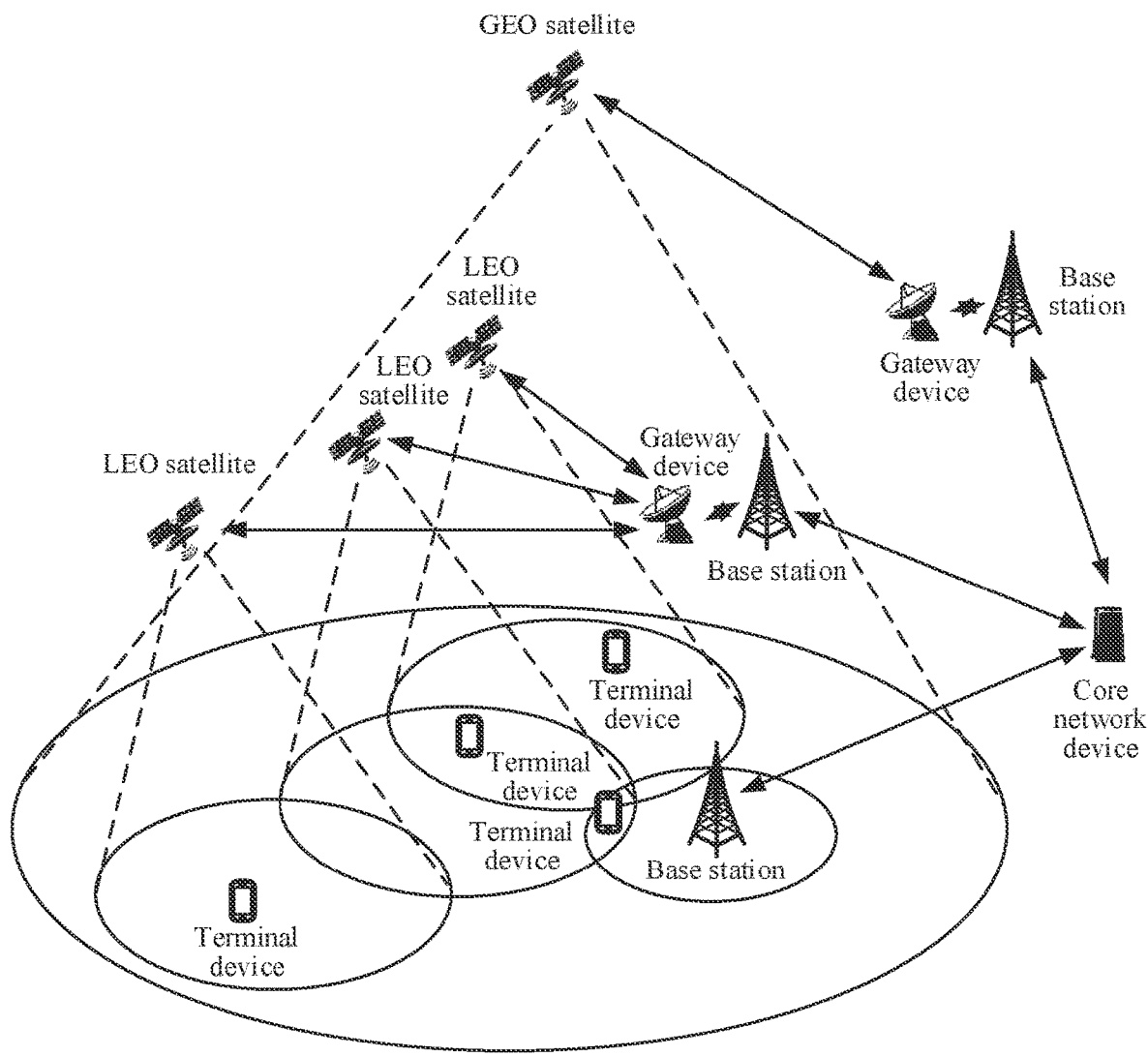
FIG. 5 is a schematic diagram of a communication scenario according to an embodiment of this application.
Figure 6:
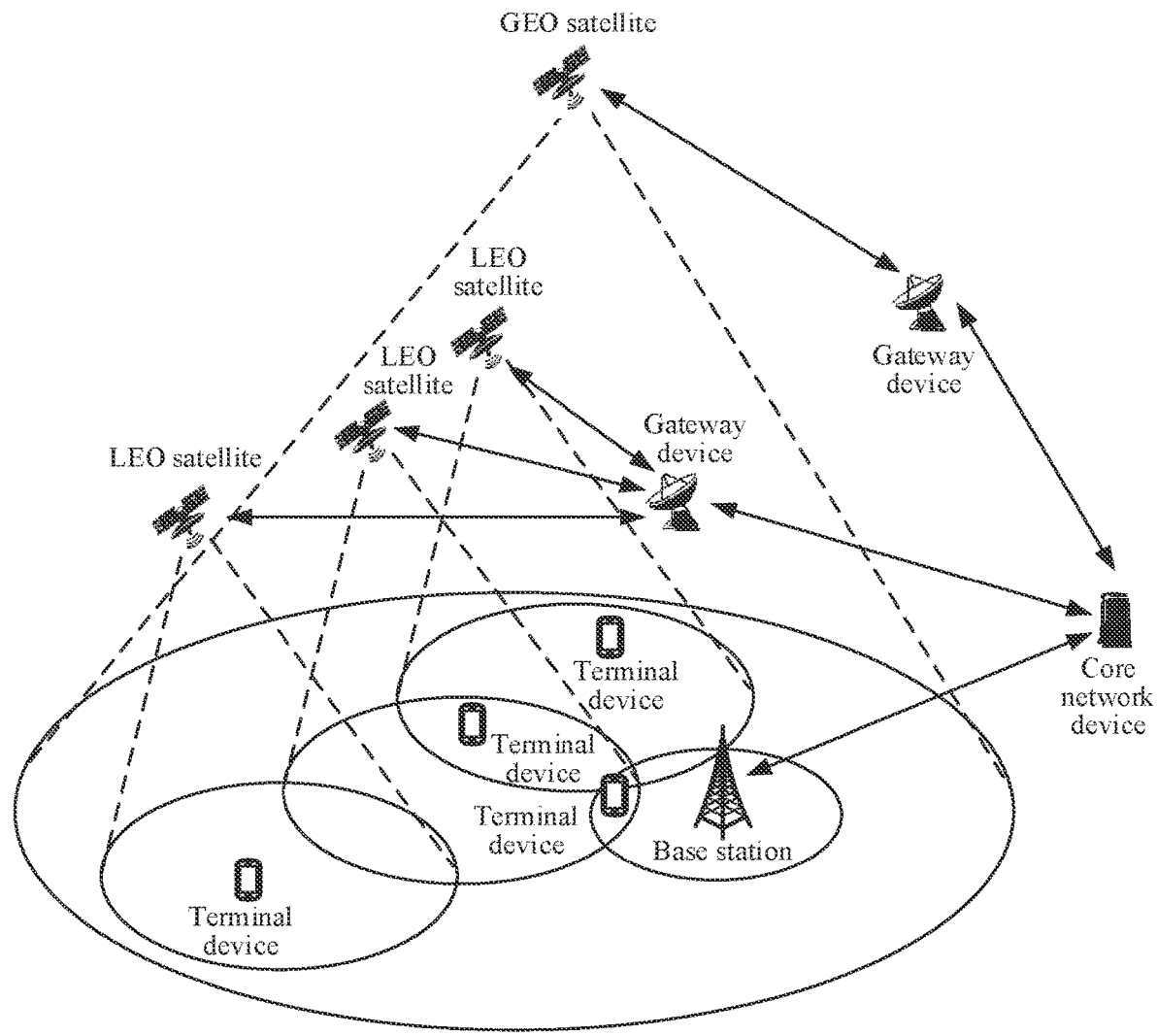
FIG. 6 is a schematic diagram of another communication scenario according to an embodiment of this application.

For example, FIG. 5 shows an example of a possible network architecture. In the network architecture shown in FIG. 5, an architecture of the NTN device may be a transparent mode. FIG. 6 shows an example of another possible network architecture. In the network architecture shown in FIG. 6, an architecture of the NTN device may be a regenerative mode.

In an example, the NTN device and the access network device on the ground may be interconnected by using a common core network. Alternatively, the NTN device and the access network device on the ground may implement assistance and interconnection with higher timeliness through an interface defined between the access network devices. In NR, an interface between the access network devices may be referred to as an Xn interface, and an interface between the access network device and the core network may be referred to as an NG interface. The NTN device and the access network device on the ground may implement communication and collaboration through the Xn interface or the NG interface.

Optionally, a link between the NTN device and a terminal device may be referred to as a service link, and a link between the NTN device and the gateway device may be referred to as a feeder link.

Network elements in embodiments of this application include a network device and a terminal device.

Figure 7:
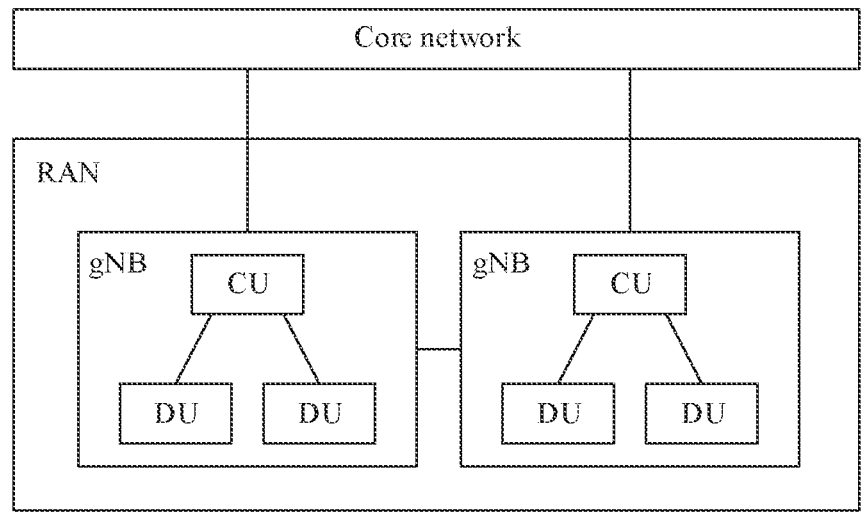
FIG. 7 is a schematic diagram of a structure of an access network device according to an embodiment of this application.

The network device may be an NTN device having all or some functions of an access network device, or may be an access network device on the ground. The access network device is an entity, on a network side, that is configured to transmit or receive a signal, for example, a new generation base station (generation NodeB, gNodeB). The access network device may be a device configured to communicate with a mobile device. The access network device may be an AP in a wireless local area network (WLAN), or may be an evolved base station (evolved NodeB, eNB, or eNodeB) in long term evolution (LTE), or a relay station, or an access point, or integrated access and backhaul (IAB), or on-board equipment, a wearable device, an access network device in a future 5G network, or an access network device in a future evolved public land mobile network (public land mobile network, PLMN), gNodeB (gNB) in an NR system, or the like. In addition, in embodiments of this application, the access network device provides a service for a cell, and the terminal device communicates with the access network device by using a transmission resource (for example, a frequency domain resource or a spectrum resource) used by the cell. In embodiments of this application, the access network device may be a central unit (CU) or a distributed unit (DU). Alternatively, the access network device may include a CU and a DU, as shown in FIG. 7. The CU and the DU may be physically separated, or may be deployed together. This is not specifically limited in embodiments of this application. One CU may be connected to one DU. Alternatively, a plurality of DUs may share one CU, which can reduce costs and facilitate network expansion. The CU and the DU may be split according to a protocol stack. One possible manner is to deploy a radio resource control (RRC) layer, a service data adaptation protocol (SDAP) stack, and a packet data convergence protocol (PDCP) layer in the CU, and deploy a radio link control (RLC) layer, a media access control (MAC) layer, and a physical layer in the DU. Embodiments of this application are not completely limited by the foregoing splitting manner based on a protocol stack, and may further include other splitting manners. The CU and the DU are connected through an F1 interface. The CU indicates that the gNB is connected to the core network through an Ng interface. The access network device in embodiments of this application may alternatively be a central unit control plane (CU-CP) node or a central unit user plane (CU-UP) node, or the access network device may be a CU-CP and a CU-UP. The CU-CP is responsible for control plane functions, and mainly includes RRC and PDCP-C. The PDCP-C is mainly responsible for data encryption and decryption, integrity protection, data transmission, and the like on the control plane. The CU-UP is responsible for user plane functions, and mainly includes SDAP and PDCP-U. The SDAP is mainly responsible for processing core network data and mapping flows to bearers. The PDCP-U is mainly responsible for encryption and decryption, integrity protection, header compression, sequence number maintenance, data transmission, and the like on the data plane. The CU-CP and the CU-UP are connected through an E1 interface. The CU-CP indicates that the gNB is connected to the core network through the Ng interface, and is connected to the DU through F1-C (control plane). The CU-UP is connected to the DU through F1-U (user plane). Certainly, in another possible implementation, the PDCP-C is also in the CU-UP. The access network device mentioned in embodiments of this application may be a device including a CU, or a DU, a device including a CU and a DU, or a device including a control plane CU node (a CU-CP node), a user plane CU node (a CU-UP node), and a DU node. In addition, in another possible case, the access network device may be another apparatus that provides a wireless communication function for the terminal device. A specific technique and a specific device form used by the access network device are not limited in embodiments of this application. For ease of description, in embodiments of this application, an apparatus that provides a wireless communication function for a terminal device is referred to as an access network device.

The terminal device may be a device that can receive scheduling and indication information of the access network device (or an NTN device). The terminal device may be a device that provides voice and/or data connectivity for a user, a handheld device with a wireless connection function, or another processing device connected to a wireless modem. The terminal device may communicate with one or more core networks or the Internet via a radio access network (for example, RAN). The terminal device may be a mobile terminal device, such as a mobile phone (or referred to as "cellular" phone or cellphone (mobile phone)), or a computer and a data card, for example, may be a portable, pocket-sized, handheld, computer-built-in, or on-board mobile apparatus that exchanges language and/or data with the radio access network, such as a personal communications service (PCS) phone, a cordless phone, a session initiation protocol (SIP) phone, a wireless local loop (WLL) station, a personal digital assistant (PDA), a tablet computer (Pad), or a computer with a wireless transceiver function. The terminal device may also be referred to as a system, a subscriber unit, a subscriber station, a mobile station, a mobile station (MS), a remote station, an access point (AP), a remote terminal device (remote terminal), an access terminal device (access terminal), a user terminal device (user terminal), a user agent (user agent), a subscriber station (SS), customer premises equipment (CPE), a terminal, user equipment (UE), a mobile terminal (MT), or the like. Alternatively, the terminal device may be a wearable device and a next-generation communication system, for example, a terminal device in a 5G network or a terminal device in a future evolved PLMN network, or a terminal device in a new radio (NR) communication system. Alternatively, the terminal device may be a terminal communicating with the NTN device.

In addition, embodiments of this application may also be applicable to other future-oriented communication technologies. The network architecture and the service scenario described in this application are intended to describe the technical solutions of this application more clearly, but are not intended to limit the technical solutions provided in this application. A person of ordinary skill in the art may learn that, with evolution of the network architecture and emergence of a new service scenario, the technical solutions provided in this application are also applicable to similar technical problems.

It is to be noted that, a type and a format of the foregoing communication system are not limited in embodiments of this application. For example, the communication system may be: a fifth generation (5G) communication system, a long term evolution (LTE) communication system, or the like.

Embodiments of this application may be applied to a fourth generation (4G) mobile communication system, a 5G system, an NTN system, vehicle to everything (V2X), long term evolution-Internet of Vehicles (LTE-V), vehicle to vehicle (V2V), Internet of Vehicles, machine type communications (MTC), Internet of Things (IoT), long term evolution-machine to machine (LTE-M), machine to machine (M2M), Internet of Things, or a future mobile communication system.

In satellite communication, a signal of a ground base station connected to a satellite is forwarded by the satellite. After the signal is forwarded by the satellite, the ground base station connected to the satellite is characterized by wide coverage and a long latency, and is different from a common ground base station signal. Such a difference greatly affects services for UE, and further affects a decision such as cell reselection. For example, in a current reselection mechanism, a cell priority is bound to a frequency. That is, the cell priority is determined when the frequency of a cell is specified. Whether to start measurement and a criteria for selecting a target cell after measurement are closely related to a frequency priority.

When a non-synchronous satellite moves at a high speed, a terminal device senses frequent satellite beam handover due to satellite movement. In an LEO scenario with a non-staring beam, assuming that the satellite moves at a speed of about 7.5 km/s, for example, a typical 200 km beam in a low frequency band undergoes handover approximately every 30 s; and a 20 km beam in a high frequency band undergoes handover approximately every 3 s.

In an LEO scenario with a staring beam, assuming that a distance of a satellite coverage region is 2000 km, handover occurs approximately every 4.5 minutes. In a scenario of a satellite with an orbit of 300 km, assuming that a beam opening angle is ±30° and a distance of a satellite coverage region is 300 km, handover occurs approximately every 40 s.

Due to high-speed movement of the satellite, network handover is more frequent than that in a cellular scenario. However, frequent handover causes fast update of measurement-related configuration information. Before performing cell handover/cell reselection, the terminal device learns that basic configuration of a reference signal of a neighboring cell includes at least information such as a reference frequency and priority. After cell reselection, the terminal device needs to re-read measurement configuration information of a new cell. Frequent reselection causes excessive power consumption of the terminal device.

Based on this, embodiments of this application provide a cell selection method and apparatus, to resolve a problem of excessive power consumption caused by frequent cell reselection performed by a terminal device in NTN communication. The method and the apparatus are conceived based on a same invention. The method and the apparatus have similar principles for resolving the problems. Therefore, for implementation of the apparatus and the method, reference may be made to each other, and details of repeated parts are not described.

It should be understood that, in embodiments of this application, "at least one" means one or more, and "a plurality of" means two or more. The term "and/or" is an association relationship for describing associated objects and represents that three relationships may exist. For example, A and/or B may represent the following three cases: Only A exists, both A and B exist, and only B exists. A and B may be singular or plural. The character "/" generally indicates that the associated objects are in an "or" relationship. "At least one of the following items (pieces)" or a similar expression thereof refers to any combination of these items, including any combination of singular items (pieces) or plural items (pieces). For example, at least one of a, b, or c may represent: a, b, c, a and b, a and c, b and c, or a, b, and c, where a, b, and c may be one or more.

It should be understood that, in the descriptions of this application, terms such as "first" and "second" are merely used for distinction and description, and cannot be understood as an indication or implication of relative importance or an indication or implication of a sequence.

The following specifically describes a cell selection method provided in this application with reference to the accompanying drawings.

Figure 8:
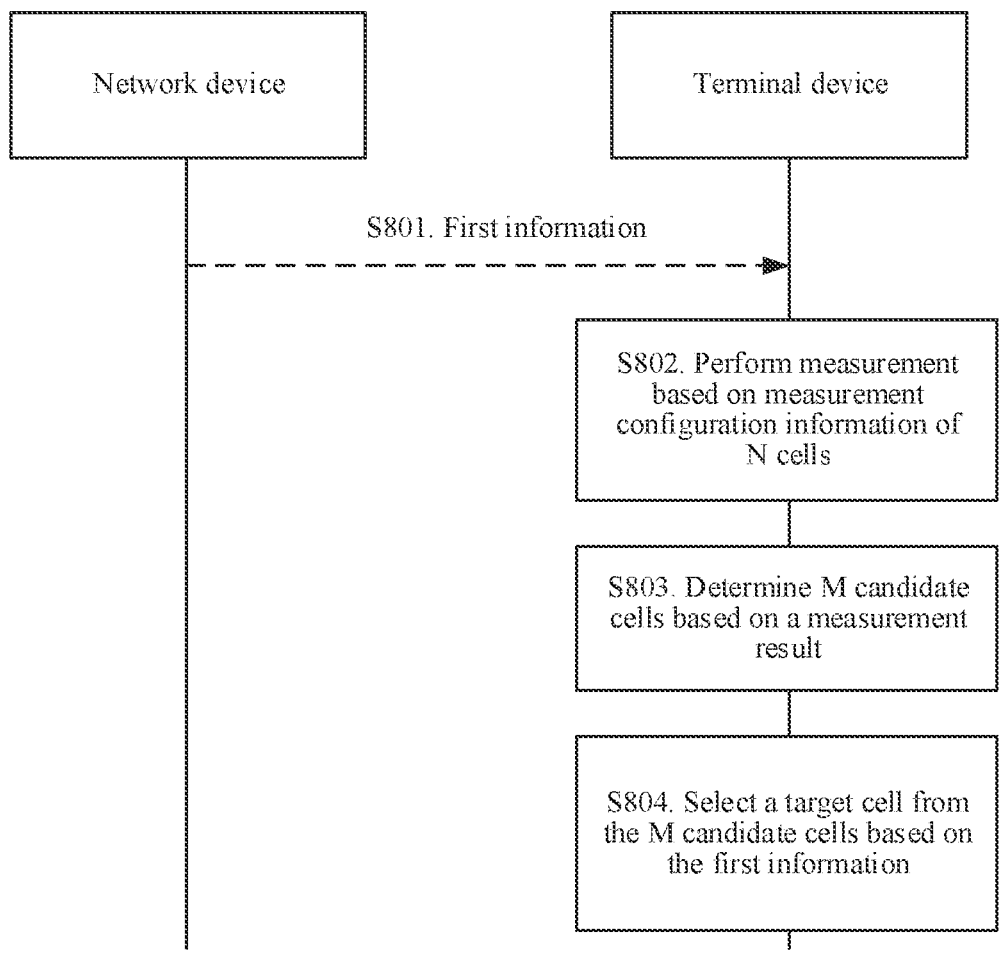
FIG. 8 is a schematic flowchart of a cell selection method according to an embodiment of this application.

FIG. 8 shows a cell selection method according to an embodiment of this application. The cell selection method provided in this application may be applied in a cell reselection scenario, or may be applied in a cell handover scenario. The following uses a cell reselection scenario as an example for description. It should be understood that a manner of determining a target cell based on information about a network type of a cell in the cell handover scenario is similar to a manner of determining a target cell based on information about a network type of a cell in the cell reselection scenario. The cell selection method may specifically include the following steps:

S801. A first network device sends first information to a terminal device, where the first information includes coverage information of at least one cell. Correspondingly, the terminal device may receive the first information sent by the network device.

Coverage information of each cell includes coverage time information of the cell covering a first geographical region and coverage time information of a network device corresponding to the cell covering the first geographical region. For ease of description, the following uses a first cell as an example for description.

Optionally, coverage information of a cell may include coverage time information of the cell covering the terminal device and coverage time information of a network device corresponding to the cell covering the terminal device.

Alternatively, coverage information of a cell may include time information of the cell that can provide a service for the terminal device and time information of a network device corresponding to the cell that can provide a service for the terminal device.

Optionally, the first network device may be a network device corresponding to a serving cell of the terminal device.

In an implementation, when the terminal device is in a connected state, the terminal device may receive radio resource control (RRC) signaling or a system information block (SIB) sent by the first network device, to obtain the first information.

In another implementation, when the terminal device is in a non-connected state, the terminal device may receive an RRC release message sent by the first network device, to obtain the first information.

In still another implementation, the terminal device may read a broadcast message of a newly camped-on cell, to obtain the first information.

In a description of an example, coverage information of the first cell may include coverage time information of all cells of a network device corresponding to the first cell, coverage time information of a $j^{th}$ cell of the network device includes start time and end time at which the $j^{th}$ cell covers the first geographical region, j={1, 2, . . . , J}, and N is a quantity of the cells under the network device. In another embodiment, the coverage information of the first cell may include coverage time information of some cells (for example, cells that can cover the terminal device) of the network device corresponding to the first cell.

It is to be noted that, all the cells of the network device corresponding to the first cell include the first cell. Therefore, the coverage time information of all the cells of the network device includes coverage time information of the first cell. The terminal device may determine, based on the coverage time information of the first cell in the coverage time information of all the cells, start time and end time at which the first cell covers the first geographical region. The terminal device may determine, based on the coverage time information of all the cells of the network device, start time and end time at which the network device covers the first geographical region. For example, the terminal device may determine the start time at which the network device covers the first geographical region as an earliest time point in start time at which all the cells cover the first geographical region, and may determine the end time at which the network device covers the first geographical region as a latest time point in end time at which all the cells cover the first geographical region.

Figure 9:
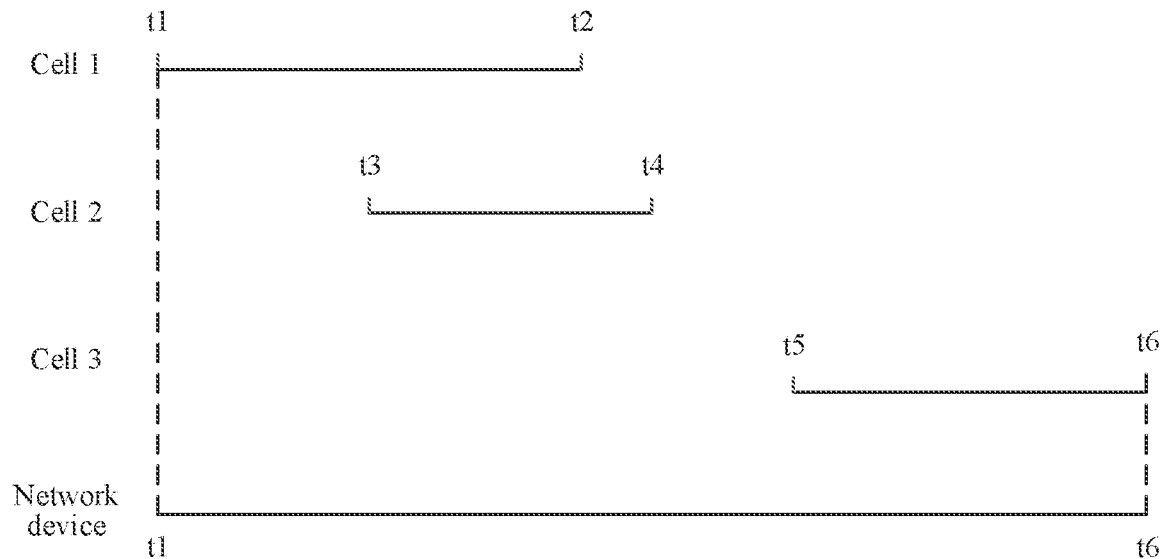
FIG. 9 is a schematic diagram of coverage time information of a network device according to an embodiment of this application.

For example, as shown in FIG. 9, cells provided by the network device corresponding to the first cell include a cell 1, a cell 2, and a cell 3. A time period in which the cell 1 covers the first geographical region is t1 to t2. A time period in which the cell 2 covers the first geographical region is t3 to t4. A time period in which the cell 3 covers the first geographical region is t5 to t6. Start time at which the network device corresponding to the first cell covers the first geographical region may be a minimum value t1 in t1, t3, and t5. End time at which the network device corresponding to the first cell covers the first geographical region may be a maximum value t6 in t2, t4, and t6. Therefore, a time period in which the network device corresponding to the first cell covers the first geographical region is t1 to t6.

In an implementation, the first network device may determine the coverage time information of all the cells of the network device based on a moving speed and a moving direction of the network device corresponding to the first cell, coverage parameters of all the cells of the network device corresponding to the first cell, and a location of the first geographical region in which the terminal device is located. A coverage parameter of each cell indicates a coverage region of the cell.

Optionally, the first network device may obtain the location of the first geographical region in which the terminal device is located before the terminal device is in the non-connected state.

For example, if a coverage region of a cell is circular or approximately circular, a coverage parameter of the cell may include central coordinates and a coverage radius of the cell.

If a coverage region of a cell is elliptical or approximately elliptical, a coverage parameter of the cell may include central coordinates, a major axis radius, and a minor axis radius of the cell, and may further include a direction of a major axis or a minor axis.

If a coverage region of a cell is square or approximately square, a coverage parameter of the cell may include central coordinates and a side length of the cell, and may further include a direction of one side.

If a coverage region of a cell is rectangular or approximately rectangular, a coverage parameter of the cell may include central coordinates, a length of a long side, and a length of a short side of the cell, and may further include a direction of the long side or the short side.

Alternatively, a coverage parameter of a cell may include a reference direction of a coverage region of the cell relative to a network device corresponding to the cell, and a maximum communicable expansion angle in the reference direction.

The central coordinates of the cell, and a moving speed and a moving direction of the cell may be based on a specified coordinate system. For example, the specified coordinate system may be an earth-centered earth-fixed (ECEF) coordinate system.

In a description of another example, coverage information of the first cell includes coverage time information of the first cell and coverage time information of a network device corresponding to the first cell, the coverage time information of the first cell includes start time and end time at which the first cell covers the first geographical region, and the coverage time information of the network device corresponding to the first cell includes start time and end time at which the network device covers the first geographical region.

In an implementation, the first network device may determine the coverage time information of the first cell based on a moving speed and a moving direction of the network device corresponding to the first cell, a coverage parameter of the first cell, and a location of the first geographical region in which the terminal device is located, and may determine the coverage time information of the network device based on the moving speed and the moving direction of the network device corresponding to the first cell, a coverage parameter of the network device corresponding to the first cell, and the location of the first geographical region in which the terminal device is located.

Optionally, the first network device may obtain the location of the first geographical region in which the terminal device is located before the terminal device is in the non-connected state.

If a coverage region of a network device is circular or approximately circular, a coverage parameter of the network device may include central coordinates and a coverage radius of the network device.

If a coverage region of a network device is elliptical or approximately elliptical, a coverage parameter of the network device may include central coordinates, a major axis radius, and a minor axis radius of the network device, and may further include a direction of a major axis or a minor axis.

If a coverage region of a network device is square or approximately square, a coverage parameter of the network device may include central coordinates and a side length of the network device, and may further include a direction of one side.

If a coverage region of a network device is rectangular or approximately rectangular, a coverage parameter of the network device may include central coordinates, a length of a long side, and a length of a short side of the network device, and may further include a direction of the long side or the short side.

The central coordinates of the network device, and a moving speed and a moving direction of the network device may be based on a specified coordinate system. For example, the specified coordinate system may be an ECEF coordinate axis.

In a description of still another example, coverage information of the first cell may include a moving speed and a moving direction of a network device corresponding to the first cell, a coverage parameter of the first cell, and a coverage parameter of the network device corresponding to the first cell.

In an implementation, the terminal device may determine coverage time information of the first cell based on the moving speed and the moving direction of the network device corresponding to the first cell, the coverage parameter of the first cell, and a location of the first geographical region in which the terminal device is located, and may determine coverage time information of the network device corresponding to the first cell based on the moving speed and the moving direction of the network device corresponding to the first cell, the coverage parameter of the network device corresponding to the first cell, and the location of the first geographical region in which the terminal device is located.

In a description of yet still another example, coverage information of the first cell may include a moving speed and a moving direction of a network device corresponding to the first cell, and a coverage parameter of each cell of the network device corresponding to the first cell.

In an implementation, the terminal device may determine coverage time information of each cell of the network device based on the moving speed and the moving direction of the network device corresponding to the first cell, the coverage parameter of each cell of the network device, and a location of the first geographical region in which the terminal device is located, and may determine coverage time information of the network device based on the coverage time information of each cell of the network device corresponding to the first cell.

In a possible implementation, the first network device may obtain the first information from a core network device connected to the first network device.

Different network devices may be connected to a same core network device, or may be connected to different core network devices. For cells of a second network device, the second network device and the first network device are connected to a same core network device, and the core network device connected to the first network device may obtain coverage information of the cells of the second network device from the second network device. For cells of a third network device, the third network device and the first network device are connected to different core network devices, and the core network device connected to the first network device may obtain coverage information of the cells of the third network device from the core network device connected to the third network device.

Figure 10:
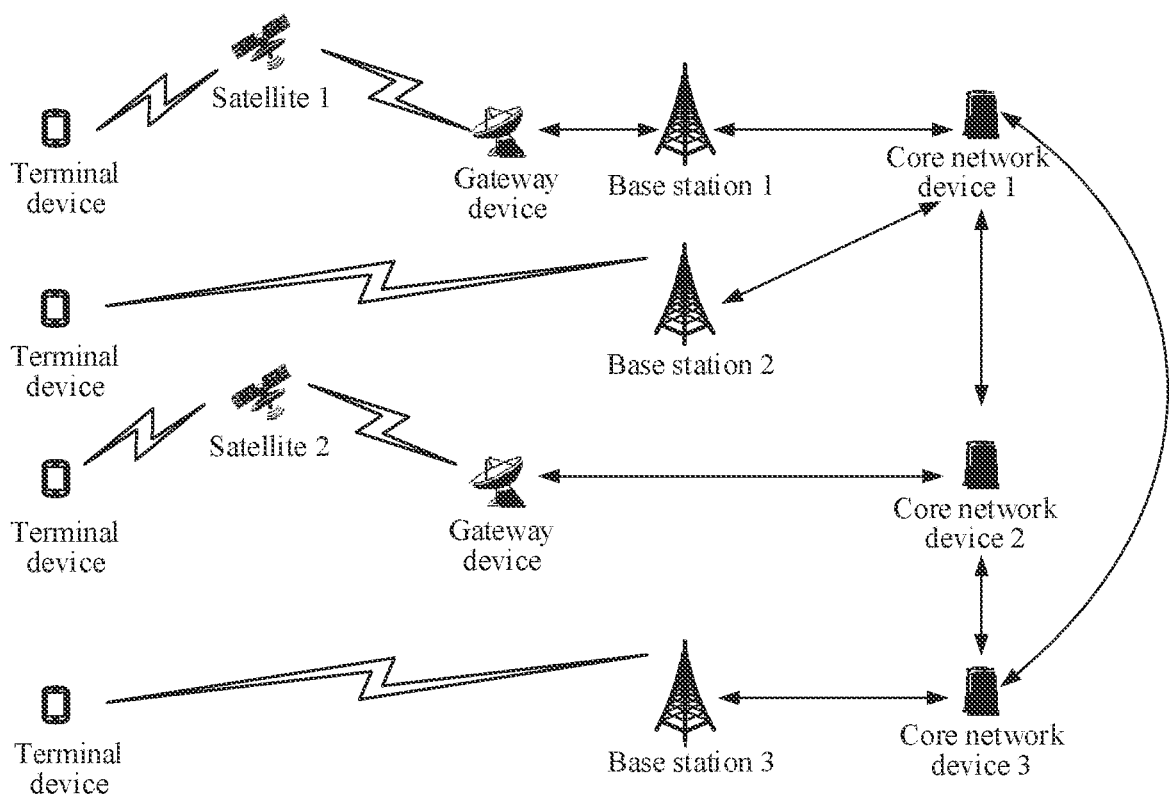
FIG. 10 is a schematic diagram of a method for obtaining first information by a network device according to an embodiment of this application.

For example, as shown in FIG. 10, assuming that the first network device is a satellite 1, the first network device may request coverage information of a cell of a base station 2, a cell of a satellite 2, and a cell of a base station 3 from a core network device 1, and the core network device 1 may obtain the coverage information of the cell of the base station 2 from the base station 2, obtain the coverage information of the cell of the satellite 2 from a core network device 2, and obtain the coverage information of the cell of the base station 3 from a core network device 3.

For example, the first network device may request coverage information of the at least one cell from a connected core network device. Alternatively, a core network device connected to the first network device may actively send coverage information of the at least one cell to the first network device. The at least one cell may include some or all cells covered by the first network device, and may further include cells around the first network device.

Optionally, a core network device connected to the first network device may determine the at least one cell based on deployment information of the first network device. For example, if the first network device is a cellular network access network device, the deployment information of the first network device may be a geographical location of the first network device. If the first network device is an NTN device, the deployment information of the first network device may be a moving location, a moving rule, and the like of the first network device.

If the first network device is a high-speed moving non-synchronous orbit satellite, coverage information of cells covered by the first network device and surrounding cells may change with time. Therefore, a core network device connected to the first network device may update, at a higher frequency than a core network device in a cellular network, the coverage information of the cells covered by the first network device and the surrounding cells.

The coverage information of the cells covered by the first network device and the surrounding cells are closely related to a deployment status of the first network device. The deployment status of the first network device and a change rule of the deployment status may be pre-stored in the core network device connected to the first network device. Optionally, the deployment status of the first network device and the change rule of the deployment status may be based on a specific trigger condition (for example, a preset time period), and updated information about network types of the cells covered by the first network device and the surrounding cells is sent to the first network device when the trigger condition takes effect.

Optionally, different core network devices may belong to different operators. Therefore, operators may design a shared authentication mechanism at a core network layer. For example, a rule may be set. When a core network device of a satellite operator requests coverage information of a cell from a core network device in a cellular network, the core network device in the cellular network may send, to the core network device of the satellite operator, the coverage information of the cell requested by the core network device of the satellite operator. In this manner, the cellular network can smoothly accept a service from the satellite network, thereby improving service stability.

In an implementation, the network device may send cell reselection-related configuration information to the terminal device. The cell reselection-related configuration information may include measurement configuration information (such as a frequency and a cell priority) of at least one cell.

S802. The terminal device performs measurement based on measurement configuration information of N cells, where N is an integer greater than 0.

In an implementation, the terminal device may determine, based on a cell priority of a cell, whether to start measurement of the cell, where the cell priority is bound to a frequency. For example, if the cell priority of the cell is higher than a cell priority of a current serving cell, the terminal device unconditionally starts measurement of the cell. If the cell priority of the cell is lower than or equal to the cell priority of the current serving cell, the terminal device may measure signal quality of the current serving cell, and compare the signal quality of the current serving cell with a quality threshold. If the signal quality of the current serving cell is higher than the quality threshold, the cell may not be measured. If the signal quality of the current serving cell is not higher than the quality threshold, the cell is measured.

S803. The terminal device determines M candidate cells based on a measurement result, where M is an integer greater than 0 and less than N.

For example, for a cell with a higher cell priority than that of the current serving cell, if signal energy of the cell is greater than a first threshold of the signal energy, or if signal quality of the cell is greater than a second threshold of the signal quality, the terminal device may select the cell as a candidate cell.

Optionally, the signal energy of the cell may satisfy the following formula, or the signal energy of the cell may be determined through the following formula:

$$Srxlev = Q_{rxlevmeas} - (Q_{rxlevmin} + Q_{rxlevminoffset}) - P_{compensation} - Qoffset_{temp}.$$

Srxlev is the signal energy of the cell. For $Q_{rxlevmeas}$, $Q_{rxlevmin}$, $Q_{rxlevminoffset}$, $P_{compensation}$, and $Qoffset_{temp}$, refer to related descriptions in the foregoing step A2, and details are not described herein again.

The signal quality of the cell may satisfy the following formula, or the signal quality of the cell may be determined through the following formula:

$$Squal = Q_{qualmeas} - (Q_{qualmin} + Q_{qualminoffset}) - Qoffset_{temp}.$$

Squal is the signal quality of the cell. For $Q_{qualmeas}$, $Q_{qualmin}$, $Q_{qualminoffset}$, and $Qoffset_{temp}$, refer to related descriptions in the foregoing step A2, and details are not described herein again.

For a cell with a cell priority the same as the cell priority of the current serving cell, the terminal device may perform cell reselection based on an R criterion. For the R criterion, refer to related descriptions in the foregoing step A2, and details are not described herein again.

For a cell with a lower cell priority than that of the current serving cell, if signal energy of the cell is greater than a third threshold of the signal energy, or if signal quality of the cell is greater than a fourth threshold of the signal quality, the terminal device may select the cell as a candidate cell.

S804. The terminal device selects a target cell from the M candidate cells based on the first information. The terminal device is located in the first geographical region.

In a description of an example, when the terminal device is located in the first geographical region, the terminal device may select the target cell from the M candidate cells based on the first information.

It is to be noted that, the step S801 is not a mandatory step. In a specific implementation, the terminal device may alternatively obtain the first information in another manner. For example, the terminal device may determine, based on ephemeris information of a network device corresponding to a cell, movement information of the network device, a coverage parameter of each cell of the network device, a coverage parameter of the network device, and the like, may determine a coverage region of each cell of the network device based on the movement information of the network device corresponding to the cell, the coverage parameter of each cell of the network device, and the like, and may determine a coverage region of the network device based on the movement information of the network device corresponding to the cell, the coverage parameter of the network device, and the like. In this manner, the network device may not need to additionally indicate the first information, thereby reducing indication overheads.

Optionally, the terminal device may obtain the ephemeris information of the network device corresponding to the cell from the first network device, or the terminal device may obtain the ephemeris information of the network device corresponding to the cell in another manner. This is not specifically limited herein.

Figure 11:
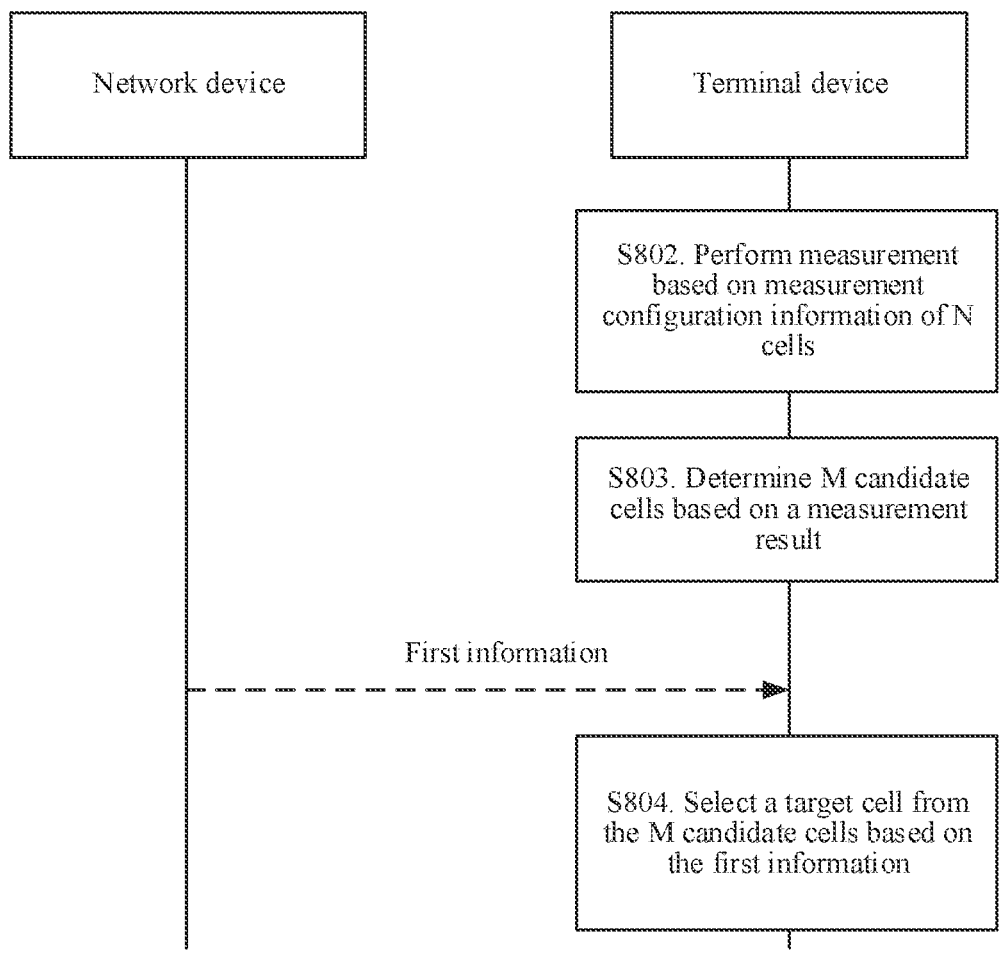
FIG. 11 is a schematic flowchart of another cell selection method according to an embodiment of this application.

Alternatively, the terminal device may obtain the first information from a second network device after the step S803. Optionally, the second network device may be a network device corresponding to a candidate cell, as shown in FIG. 11. In this manner, the terminal device obtains the first information from the candidate cell only when determining a camped cell. In this manner, configuration information that needs to be stored by the terminal device can be reduced, thereby reducing storage overheads of the terminal device. In addition, in this manner, a real-time status of a network can be reflected more accurately. A manner of obtaining the first information by the network device corresponding to the candidate cell is similar to a manner of obtaining the first information by the network device corresponding to the serving cell. For details, refer to related descriptions in the step S801. Details are not described herein again. For ease of description, a network device corresponding to a candidate cell is referred to as a second network device below.

Alternatively, the terminal device may obtain one part of the first information from the first network device through the step S801, and obtain the other part of the first information from the second network device after the step S803.

Alternatively, the terminal device may obtain H pieces of cell information before the terminal device performs measurement based on the measurement configuration information of the N cells. Each piece of cell information includes coverage information of at least one cell and information about an effective condition corresponding to the cell information, and H is an integer greater than 0. The terminal device may select to-be-used cell information based on information about effective conditions of the H pieces of cell information. The currently used cell information includes the first information. In an implementation, the terminal device may alternatively obtain the H pieces of cell information from the first network device.

For example, the effective condition may be an effective time period. Optionally, the effective time period corresponding to the cell information may be a consecutive time period. For example, the effective time period is T1 to T2. Alternatively, the effective time periods corresponding to the cell information may be discontinuous. For example, the effective time periods include: T3 to T4, T5 to T6, and T7 to T8.

In an example, information about the effective condition may be start time and end time of the effective time period. If the effective time period is a consecutive time period, the information about the effective condition may include start time and end time of the consecutive time period. If the effective time period includes a plurality of sub-time periods, the information about the effective condition may include start time and end time of each sub-time period. Optionally, if the effective time period corresponding to the cell information includes a plurality of sub-time periods, and the plurality of sub-time periods have a time rule, for example, a periodic rule, the information about the effective condition of the cell information may indicate the effective time period through the time rule. For example, duration of each of the plurality of time periods is $\Delta T$, and a time interval between two adjacent sub-time periods is $\Delta t$. The effective time period of the cell may be indicated by start time of a first sub-time period, the duration $\Delta T$, and the time interval $\Delta t$. In this manner, overheads can be reduced.

Figure 12:
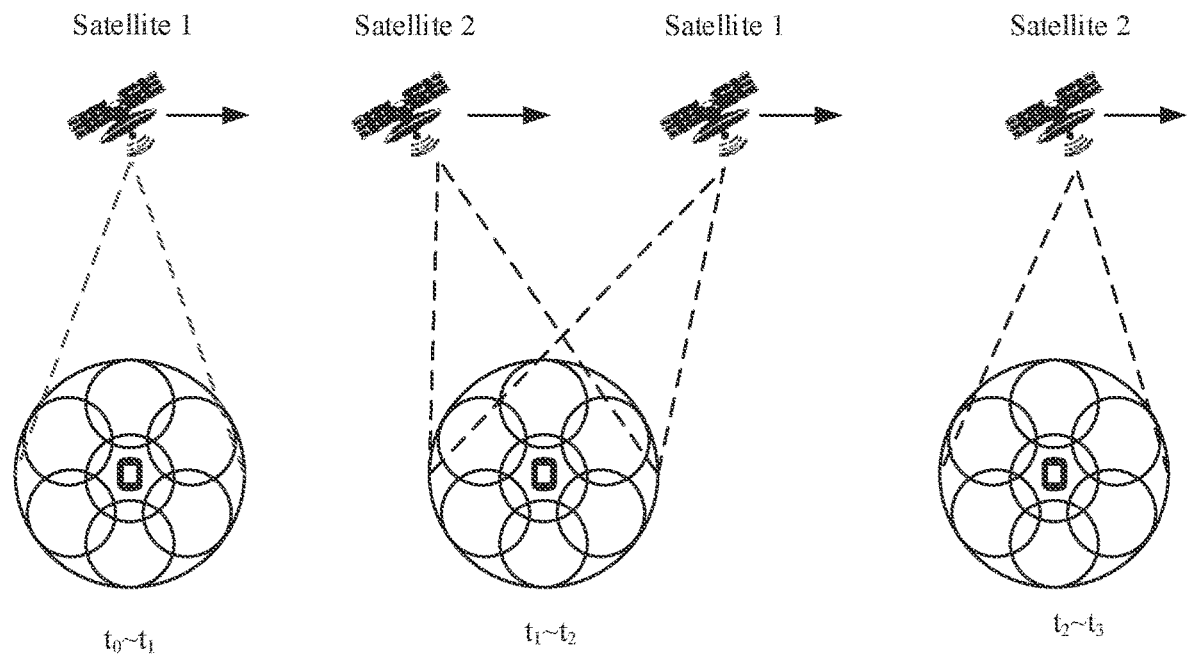
FIG. 12 is a schematic diagram of an effective time period of cell information according to an embodiment of this application.

The following uses an example in which the effective time period of the cell information is a consecutive time period for description. As shown in FIG. 12, a first geographical region in which a terminal device is located is served by a satellite 1 in a time period $t_0$ to $t_1$, is served by both the satellite 1 and a satellite 2 in a time period $t_1$ to $t_2$, where the terminal device may perform handover or reselection among cells of the satellite 1 and satellite 2 in the time period $t_1$ to $t_2$, and is served by the satellite 2 in a time period $t_2$ to $t_3$. Therefore, neighboring cells of the terminal device in the time period $t_0$ to $t_1$ include cells of the satellite 1, neighboring cells of the terminal device in the time period $t_1$ to $t_2$ include cells of the satellite 1 and the satellite 2, and neighboring cells of the terminal device in the time period $t_2$ to $t_3$ include cells of the satellite 2. The terminal device may obtain two pieces of cell information: cell information 1 and cell information 2. The cell information 1 includes coverage information of at least one cell of the satellite 1 and an effective time period $t_0$ to $t_2$, and the cell information 2 includes coverage information of at least one cell of the satellite 2 and an effective time period $t_1$ to $t_3$, as shown in Table 1.

TABLE 1

| Cell information | Effective time period |
|---|---|
| Cell information 1 | $t_0$-$t_2$ Coverage information of at least one cell of satellite 1 |
| Cell information 2 | $t_1$-$t_3$ Coverage information of at least one cell of satellite 2 |

It may be understood that the effective time periods of the two pieces of cell information may overlap in terms of time. For example, the effective time periods of the two pieces of cell information have at least one same time point. Alternatively, the effective time periods of the two pieces of cell information do not overlap in terms of time. For example, the effective time periods of the two pieces of cell information do not have a same time point.

Optionally, for a network device with a staring beam, when a plurality of pieces of cell information take effect simultaneously, the terminal device may select to-be-used cell information based on orbital plane information of a network device corresponding to a cell. For example, the terminal device may select cell information corresponding to satellites on a same orbital plane. Alternatively, for a network device with a staring beam, when cell information of different satellites on a same orbital plane takes effect simultaneously, the terminal device may select to-be-used cell information based on end time of an effective time period. For example, the terminal device may select cell information with end time of an effective time period that is later.

In a non-staring mode, effective time periods of a plurality of pieces of cell information may be set to overlap each other.

It is to be noted that, the cell information may be divided in a satellite unit, as shown in Table 1. The cell information may alternatively be divided in a unit of a frequency location, that is, one piece of cell information includes coverage information of at least one cell corresponding to one frequency location and information about an effective condition. Alternatively, the cell information may be divided in a unit of a frequency priority, that is, one piece of cell information includes coverage information of at least one cell corresponding to one frequency priority and information about an effective condition. Alternatively, the cell information may be divided in a unit of a threshold for triggering measurement, a reselection-related threshold, satellite ephemeris information (including satellite orbital plane information) corresponding to each cell, a reference type, reference time, a subcarrier width, a reference sequence format, a trigger report event, or the like. Alternatively, the cell information may be divided in units of any combination of a satellite, a frequency location, a frequency priority, a threshold for triggering measurement, a reselection-related threshold, satellite ephemeris information (including satellite orbital plane information) corresponding to each cell, a reference type, reference time, a subcarrier width, a reference sequence format, a trigger report event, and the like.

In the foregoing manner, the terminal device can simultaneously obtain a plurality of pieces of cell information, thereby reducing overheads generated by frequently reading system information.

Alternatively, before performing measurement based on the measurement configuration information of the N cells, the terminal device may receive T pieces of cell information and an effective rule. The effective rule indicates a rule of start effective time among the T pieces of cell information, and T is an integer greater than 0. The start effective time of the T pieces of cell information is determined based on the effective rule. The terminal device selects to-be-used cell information based on the start effective time of the T pieces of cell information. The cell information includes the first information, and the currently used cell information includes the first information. In an implementation, the terminal device may obtain the T pieces of cell information and the effective rule from the first network device. For example, the effective rule may be a periodic rule.

For example, duration of each of effective time periods of cell information 1 and cell information 2 is a, and a time interval is b. An offset of start time of the effective time period of the cell information 1 from a reference time point is offset2. Therefore, the effective rule may be the duration of the effective time period, the time interval, the reference time point, and the offset value offset2 of the cell information 1.

In this embodiment of this application, when cell reselection is performed, based on coverage time of a cell and coverage time of a network device corresponding to the cell, a cell with long coverage time can be preferentially selected based on the coverage time of the cell, so that a beam handover frequency can be reduced, and a cell of the network device with long coverage time can be preferentially selected based on the coverage time of the network device, so that network handover between satellites can be reduced. In addition, in this embodiment of this application, considering that different cells covered by a same satellite have some same system configuration information or have significant regularity, for example, ephemeris information and a neighboring frequency list, reselection to different cells of the same satellite actually requires less system information overheads for triggering update than reselection to different cells of different satellites. Therefore, a cell of the same satellite can be preferentially selected for cell handover by considering the coverage time of the satellite, thereby reducing system overheads.

In an implementation, when selecting the target cell from the M candidate cells based on the first information, the terminal device may perform the following actions for each of the at least one candidate cell: Remaining coverage duration of the candidate cell is determined based on coverage time information of the candidate cell covering the first geographical region, and remaining coverage duration of the network device corresponding to the candidate cell is determined based on coverage time information of the network device corresponding to the candidate cell covering the first geographical region. A metric value of the candidate cell is determined based on the remaining coverage duration of the candidate cell and the remaining coverage duration of the network device corresponding to the candidate cell. The metric value of the candidate cell indicates time in which the network device corresponding to the candidate cell serves the terminal device. After determining the metric value of each candidate cell, the terminal device may determine the target cell based on the metric value of the at least one candidate cell. The remaining coverage duration of the candidate cell may be duration from a current moment to end time at which the candidate cell covers the first geographical region. The remaining coverage duration of the network device may be duration from a current moment to end time at which the network device covers the first geographical region.

For example, the metric value of the candidate cell may be a weighted sum of the remaining coverage duration of the candidate cell and the remaining coverage duration of the network device corresponding to the candidate cell. For example, the metric value of the candidate cell may satisfy the following formula, or the metric value of the candidate cell may be determined through the following formula:

$$R = aX + bY.$$

R is a metric value of a candidate cell, X is remaining coverage duration of the candidate cell, Y is remaining coverage duration of a network device corresponding to the candidate cell, and a and b are weighted values.

Based on the manner of determining the metric value, the terminal device may select a candidate cell with a metric value greater than a threshold as the target cell. Optionally, if metric values of a plurality of candidate cells are greater than a threshold, the terminal device may select a candidate cell with a largest metric value therefrom as the target cell, or the terminal device may select any candidate cell with a metric value greater than a threshold as the target cell. Alternatively, if metric values of the M candidate cells are all less than a threshold, the terminal device may select a candidate cell with a largest metric value therefrom as the target cell. Alternatively, no threshold is set, and the terminal device selects a candidate cell with a largest metric value in the M candidate cells as the target cell.

Alternatively, the metric value of the candidate cell may satisfy a variation of the foregoing formula, or the metric value of the candidate cell may be determined through a variation of the foregoing formula. For example, R=c/X+d/Y, where c and d are weighted values.

Based on the manner of determining the metric value, the terminal device may select a candidate cell with a metric value less than a threshold as the target cell. Optionally, if metric values of a plurality of candidate cells are less than a threshold, the terminal device may select a candidate cell with a smallest metric value therefrom as the target cell, or the terminal device may select any candidate cell with a metric value less than a threshold as the target cell. Alternatively, if metric values of the M candidate cells are all greater than a threshold, the terminal device may select a candidate cell with a smallest metric value therefrom as the target cell. Alternatively, no threshold is set, and the terminal device selects a candidate cell with a smallest metric value in the M candidate cells as the target cell.

Optionally, the weighted value for determining the metric value may be preset by the first network device for the terminal device, or may be specified in a protocol. Alternatively, the first network device may include the weighted value for determining the metric value in the first information and send the first information to the terminal device.

The threshold may be preset by the first network device for the terminal device, or may be specified in a protocol. Alternatively, the first network device may include the threshold in the first information and send the first information to the terminal device.

In some embodiments, the threshold may be related to a service type of the terminal device. Therefore, the terminal device may determine, based on the service type of the terminal device, the threshold corresponding to the service type. In the foregoing manner, the target cell can satisfy a service requirement of the terminal device.

A weighting scheme of determining the metric value may be preset by the first network device for the terminal device, or may be specified in a protocol. Alternatively, the first network device may include, in the first information, information indicating the weighting scheme, and send the first information to the terminal device.

In some embodiments, when selecting the target cell from the M candidate cells, the terminal device may select the target cell based on orbital plane information of the network device corresponding to the candidate cell.

Compared with cells of satellites located on different orbital planes, system configuration information of cells of satellites located on a same orbital plane contains more same information, for example, ephemeris information of satellites located on a same orbital plane is mostly the same. Therefore, reselection to the cells of the satellites on the same orbital plane requires less overheads for updating system information than reselection to the cells of the satellites on different orbital planes. In this embodiment of this application, during cell reselection, the target cell is selected based on whether an orbital plane of a satellite on which the candidate cell is located is the same as an orbital plane of a satellite on which the current serving cell is located, so that the terminal device can preferentially select cells of satellites on a same orbital plane to perform cell reselection. In this manner, overheads of reading system information by the terminal device can be further reduced.

In an implementation, the terminal device may determine a weighting scheme based on an orbital plane on which the network device corresponding to the candidate cell is located. For example, if the network device corresponding to the candidate cell and the network device corresponding to the serving cell of the terminal device are located on a same orbital plane, the metric value of the candidate cell is determined by using a first weighting scheme. If the network device corresponding to the candidate cell and a network device corresponding to a serving cell of the terminal device are on different orbital planes, the metric value of the candidate cell is determined by using a second weighting scheme. The first weighting scheme is different from the second weighting scheme. For example, a weighted value of remaining coverage duration of a cell in the first weighting scheme is greater than a weighted value of the remaining coverage duration of the cell in the second weighting scheme, and/or a weighted value of remaining coverage duration of a network device corresponding to the cell in the first weighting scheme is greater than a weighted value of the remaining coverage duration of the network device corresponding to the cell in the second weighted scheme.

In a description of an example, the first weighting scheme may be $R=a_1X+b_1Y$; and the second weighting scheme may be $R=a_2X+b_2Y$, where $a_1$ is greater than $a_2$, or $b_1$ is greater than $b_2$, or $a_1$ is greater than $a_2$ and $b_1$ is greater than $b_2$. In the foregoing manner, cells of satellites located on a same orbital plane have a larger metric value. Therefore, when selecting the target cell based on the metric value, the terminal device may preferentially select the cells of the satellites located on the same orbital plane.

In a description of another example, the first weighting scheme may be $R=c_1/X+d_1/Y$; and the second weighting scheme may be $R=c_2/X+d_2/Y$, where $c_1$ is greater than $c_2$, or $d_1$ is greater than $d_2$, or $c_1$ is greater than $c_2$ and $d_1$ is greater than $d_2$. In the foregoing manner, cells of satellites located on a same orbital plane have a smaller metric value. Therefore, when selecting the target cell based on the metric value, the terminal device may preferentially select the cells of the satellites located on the same orbital plane.

In a possible implementation, in the second weighting scheme, the weighted value of the remaining coverage duration of the cell and the weighted value of the remaining coverage duration of the network device corresponding to the cell may be 0. In the foregoing manner, the terminal device may select cells of satellites on a same orbital plane to perform reselection.

In some implementations, before the step S804, the terminal device may obtain the orbital plane information of the network device corresponding to the candidate cell. For example, the coverage information of the candidate cell obtained by the terminal device may include the orbital plane information of the network device corresponding to the candidate cell. In another example, the terminal device may alternatively obtain, from the first network device, ephemeris information of the network device corresponding to the candidate cell, where the ephemeris information may include the orbital plane information.

Therefore, in this embodiment of this application, when cell reselection is performed, based on coverage time of a cell and coverage time of a network device corresponding to the cell, a cell of a network device with long coverage time can be preferentially selected based on the coverage time of the network device, thereby reducing network handover between satellites, and a cell with long coverage time can be preferentially selected based on the coverage time of the cell, thereby reducing a beam handover frequency.

Figure 13:
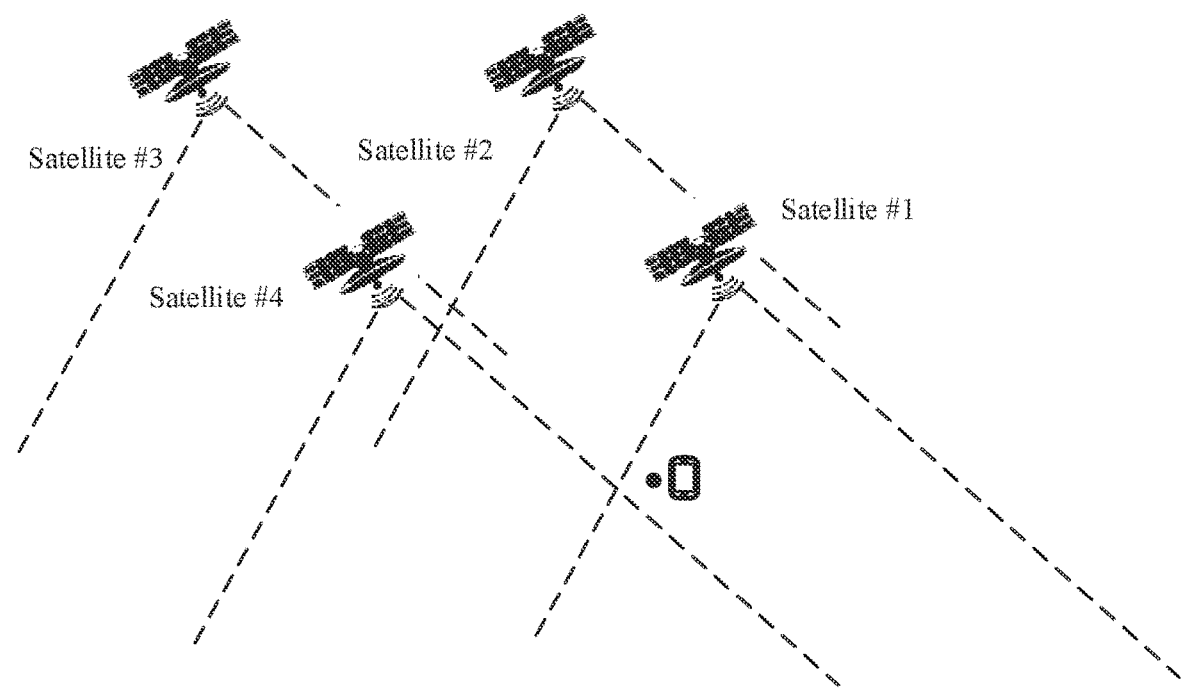
FIG. 13 is a schematic diagram of satellite handover according to an embodiment of this application.

For example, as shown in FIG. 13, a terminal device is in an overlapping coverage region of a satellite #1 and a satellite #2. When the satellites move rightward, the terminal device leaves the coverage region of the satellite #1 and enters a coverage region of a satellite #4. In this case, the terminal device needs to make a selection between the satellite #2 and the satellite #4. According to a current cell reselection mechanism, the terminal device may select a target cell based on signal quality of the satellite #2 and the satellite #4. However, because a satellite communication scenario lacks a "near-far" effect, the signal quality of the satellite #2 and the signal quality of the satellite #4 sensed by the terminal device are similar. Therefore, the terminal device may select a cell of the satellite #2 to perform reselection. As the satellites continue to move rightward, the terminal device leaves the coverage region of the satellite #2 and enters a coverage region of a satellite #3, so that the terminal device needs to make another selection between the satellite #3 and the satellite #4.

According to the method provided in embodiments of this application, the terminal device may determine, based on coverage time information of the satellite #2 and the satellite #4, that remaining coverage time of the satellite #4 is longer, so that the terminal device may preferentially select a cell of the satellite #4 to perform reselection. In this way, the terminal device performs cell reselection only when leaving the coverage region of the satellite #4. It can be learned that, compared with the existing cell reselection mechanism, a frequency of network handover between satellites can be reduced in embodiments of this application.

Figure 14:
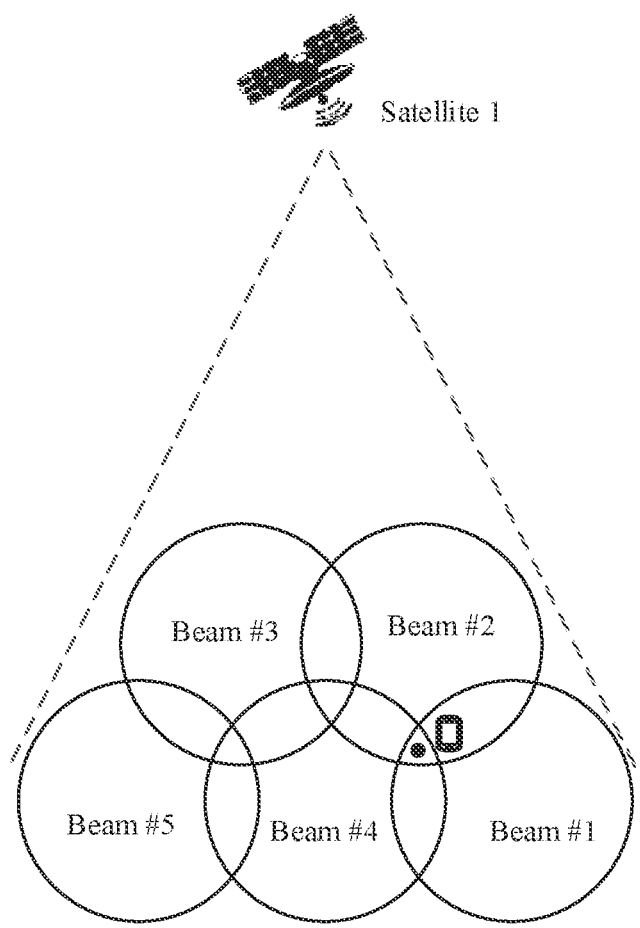
FIG. 14 is a schematic diagram of beam handover according to an embodiment of this application.

As shown in FIG. 14, a terminal device is in an overlapping coverage region of a beam #1, a beam #2, and a beam #4 of a satellite. When the satellite moves rightward, the terminal device leaves the coverage region of the beam #1 and needs to make a selection between the beam #2 and the beam #4. According to a current cell reselection mechanism, the terminal device may select a target cell based on signal quality of the beam #2 and the beam #4. However, because a satellite communication scenario lacks a "near-far" effect, the signal quality of the beam #2 and the signal quality of the beam #4 sensed by the terminal device are similar. Therefore, the terminal device may select a cell of the beam #2 to perform reselection. As the satellites continue to move rightward, the terminal device leaves the coverage region of the beam #2 and enters a coverage region of a beam #3, so that the terminal device needs to make another selection between the beam #3 and the beam #4.

According to the method provided in embodiments of this application, the terminal device may determine, based on coverage time information of the beam #2 and the beam #4, that remaining coverage time of a cell of the beam #4 is longer, so that the terminal device may preferentially select a cell covered by the beam #4 to perform reselection. In this way, the terminal device performs cell reselection only when leaving the coverage region of the beam #4. It can be learned that, compared with the existing cell reselection mechanism, a frequency of network handover between beams can be reduced in embodiments of this application.

In addition, in this embodiment of this application, considering that different cells covered by a same satellite have some same system configuration information or have significant regularity, for example, ephemeris information and a neighboring frequency list, reselection to different cells of the same satellite actually requires less system information overheads for triggering update than reselection to different cells of different satellites. Therefore, a cell of the same satellite can be preferentially selected for cell handover by considering the coverage time of the satellite, thereby reducing system overheads.

Moreover, in this embodiment of this application, compared with cells of satellites located on different orbital planes, system configuration information of cells of satellites located on a same orbital plane contains more same information, for example, ephemeris information of satellites located on a same orbital plane is mostly the same. Therefore, reselection to the cells of the satellites on the same orbital plane requires less overheads for updating system information than reselection to the cells of the satellites on different orbital planes. In this embodiment of this application, during cell reselection, the target cell is selected based on whether an orbital plane of a satellite on which the candidate cell is located is the same as an orbital plane of a satellite on which the current serving cell is located, so that the terminal device can preferentially select cells of satellites on a same orbital plane to perform cell reselection. In this manner, overheads of reading system information by the terminal device can be further reduced.

Figure 15:
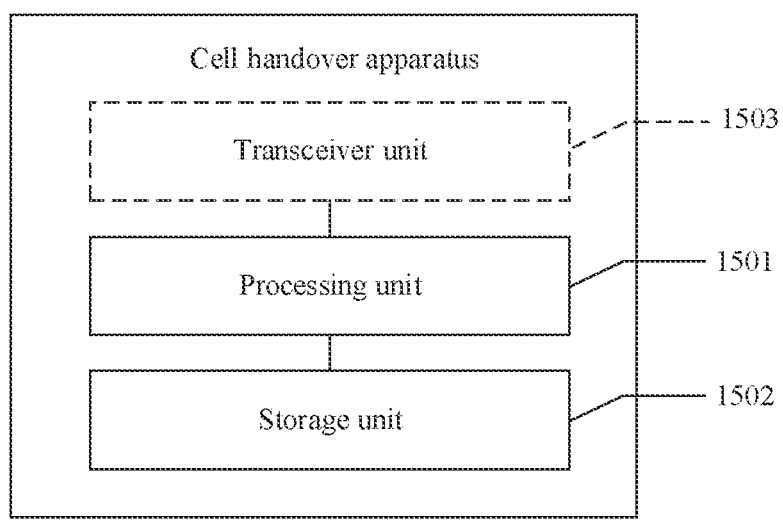
FIG. 15 is a schematic diagram of a structure of a cell handover apparatus according to an embodiment of this application.

Based on a same inventive concept as the method embodiments, an embodiment of this application provides a cell handover apparatus. A structure of the cell handover apparatus may be shown in FIG. 15, and includes a processing unit 1501 and a storage unit 1502. The cell handover apparatus may be specifically configured to implement the method performed by the terminal device in the foregoing embodiments. The apparatus may be the terminal device, or may be a chip or a chipset or a part of a chip configured to perform a related method function in the terminal device. The storage unit 1502 is configured to store code instructions. The processing unit 1501 is configured to call the code instructions stored in the storage unit 1502 to: perform measurement based on measurement configuration information of N cells, where N is an integer greater than 0; determine M candidate cells based on a measurement result, where M is an integer greater than 0 and less than N; and select a target cell from the M candidate cells based on first information, where the first information includes coverage information of at least one candidate cell in the M candidate cells, coverage information of an $i^{th}$ candidate cell in the at least one candidate cell includes coverage time information of the $i^{th}$ candidate cell covering a first geographical region and coverage time information of a network device corresponding to the first candidate cell covering the first geographical region, the terminal device is located in the first geographical region, $i=\{1, 2, \ldots, I\}$, and I is a quantity of candidate cells in the at least one candidate cell.

Optionally, when selecting the target cell from the M candidate cells based on the first information, the processing unit 1501 is specifically configured to: for each candidate cell in the at least one candidate cell, determine remaining coverage duration of the candidate cell based on coverage time information of the candidate cell covering the first geographical region, and determine remaining coverage duration of a network device corresponding to the candidate cell based on coverage time information of the network device corresponding to the candidate cell covering the first geographical region; determine a metric value of the candidate cell based on the remaining coverage duration of the candidate cell and the remaining coverage duration of the network device corresponding to the candidate cell, where the metric value of the candidate cell indicates time in which the network device corresponding to the candidate cell serves the terminal device; and determine the target cell based on the metric value of the at least one candidate cell.

For example, the metric value of the candidate cell is a weighted sum of the remaining coverage duration of the candidate cell and the remaining coverage duration of the network device corresponding to the candidate cell.

For example, if the network device corresponding to the candidate cell and a network device corresponding to a serving cell of the terminal device are on a same orbital plane, the metric value of the candidate cell may be determined by using a first weighting scheme; or if the network device corresponding to the candidate cell and a network device corresponding to a serving cell of the terminal device are on different orbital planes, the metric value of the candidate cell may be determined by using a second weighting scheme. The first weighting scheme satisfies at least one of the following conditions: A weighted value of remaining coverage duration of a cell in the first weighting scheme is not less than a weighted value of the remaining coverage duration of the cell in the second weighting scheme, and a weighted value of remaining coverage duration of a network device corresponding to the cell in the first weighting scheme is not less than a weighted value of the remaining coverage duration of the network device corresponding to the cell in the second weighted scheme.

For example, the coverage information of the $i^{th}$ candidate cell may include orbital plane information of the network device corresponding to the $i^{th}$ candidate cell.

For example, the coverage information of the $i^{th}$ candidate cell includes coverage time information of all cells of the network device corresponding to the $i^{th}$ candidate cell, coverage time information of a $j^{th}$ cell of the network device includes start time and end time at which the $j^{th}$ cell covers the first geographical region, $j=\{1, 2, \ldots, J\}$, and J is a quantity of the cells of the network device.

Alternatively, the coverage information of the $i^{th}$ candidate cell may include the coverage time information of the $i^{th}$ candidate cell and the coverage time information of the network device corresponding to the $i^{th}$ candidate cell, the coverage time information of the $i^{th}$ candidate cell includes start time and end time at which the $i^{th}$ candidate cell covers the first geographical region, and the coverage time information of the network device includes start time and end time at which the network device covers the first geographical region.

Alternatively, the coverage information of the $i^{th}$ candidate cell may include a moving speed and a moving direction of the network device corresponding to the $i^{th}$ candidate cell, a coverage parameter of the $i^{th}$ candidate cell, and a coverage parameter of the network device. The coverage parameter of the $i^{th}$ candidate cell indicates a coverage region of the $i^{th}$ candidate cell, and the coverage parameter of the network device indicates a coverage region of the network device.

Alternatively, the coverage information of the $i^{th}$ candidate cell includes a moving speed and a moving direction of the network device corresponding to the $i^{th}$ candidate cell, and coverage parameters of all cells of the network device corresponding to the $i^{th}$ candidate cell. A coverage parameter of a $j^{th}$ cell of the network device indicates a coverage region of the $j^{th}$ cell, $j=\{1, 2, \ldots, J\}$, and J is a quantity of the cells of the network device.

For example, the coverage parameter of the $i^{th}$ candidate cell may include central coordinates and a coverage radius of the $i^{th}$ candidate cell, or the coverage parameter of the $i^{th}$ candidate cell includes central coordinates, a major axis radius, and a minor axis radius of the $i^{th}$ candidate cell, or the coverage parameter of the $i^{th}$ candidate cell includes a side length of the $i^{th}$ candidate cell, or the coverage parameter of the $i^{th}$ candidate cell includes a reference direction of the $i^{th}$ candidate cell relative to the network device corresponding to the $i^{th}$ candidate cell, and a maximum communicable expansion angle in the reference direction.

The coverage parameter of the network device may include central coordinates and a coverage radius of the network device, or the coverage parameter of the network device includes central coordinates, a major axis radius, and a minor axis radius of the network device, or the coverage parameter of the network device includes a side length of the network device.

For example, the coverage parameter of the $j^{th}$ cell includes central coordinates and a coverage radius of the $j^{th}$ cell, or the coverage parameter of the $j^{th}$ cell includes central coordinates, a major axis radius, and a minor axis radius of the $j^{th}$ cell, or the coverage parameter of the $j^{th}$ cell includes a side length of the $j^{th}$ cell, or the coverage parameter of the $j^{th}$ cell includes a reference direction of the $j^{th}$ cell relative to the network device corresponding to the $i^{th}$ candidate cell, and a maximum communicable expansion angle in the reference direction.

Optionally, the apparatus may further include a transceiver unit 1503. The transceiver unit 1503 may be configured to: receive the first information from the serving cell before the processing unit 1501 performs measurement based on the measurement configuration information of the N cells.

Alternatively, the transceiver unit 1503 is configured to: receive the first information from the $i^{th}$ candidate cell in the M candidate cells after the processing unit 1501 determines the M candidate cells based on the measurement result.

Alternatively, the transceiver unit 1503 is configured to: receive H pieces of cell information from the serving cell before the processing unit 1501 performs measurement based on the measurement configuration information of the N cells, where each piece of cell information includes coverage information of at least one cell and information about an effective condition corresponding to the cell information, and H is an integer greater than 0.

The processing unit 1501 may be further configured to: select to-be-used cell information based on information about effective conditions of the H pieces of cell information, where the cell information includes the first information.

For example, the effective condition is an effective time period.

Alternatively, the transceiver unit 1503 may be configured to: receive T pieces of cell information and an effective rule from the serving cell before the processing unit 1501 performs measurement based on the measurement configuration information of the N cells, where the effective rule indicates a rule of start effective time among the T pieces of cell information, and T is an integer greater than 0.

The processing unit 1501 may be further configured to: determine the start effective time of the T pieces of cell information based on the effective rule; and select to-be-used cell information based on the start effective time of the T pieces of cell information, where the cell information includes the first information.

Figure 16:
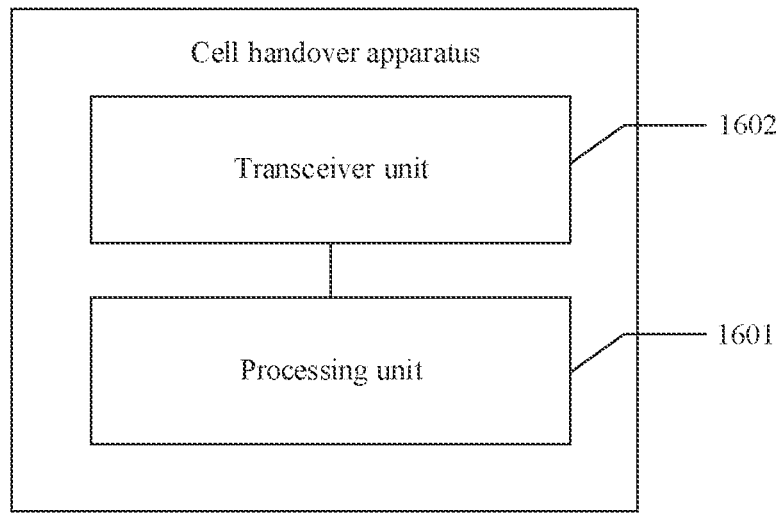
FIG. 16 is a schematic diagram of a structure of another cell handover apparatus according to an embodiment of this application.

An embodiment of this application provides another communication apparatus. A structure of the cell handover apparatus may be shown in FIG. 16, and includes a processing unit 1601 and a transceiver unit 1602. The cell handover apparatus may be specifically configured to implement the method performed by the network device in the foregoing embodiments. The apparatus may be the network device, or may be a chip or a chipset or a part of a chip configured to perform a related method function in the network device. The processing unit 1601 is configured to determine first information. The first information includes coverage information of at least one cell, coverage information of a $k^{th}$ cell in the at least one cell includes coverage time information of the $k^{th}$ cell covering a first geographical region and coverage time information of a network device corresponding to the $k^{th}$ cell covering the first geographical region, $k=\{1, 2, \ldots, K\}$, and K is a quantity of cells in the at least one cell. The transceiver unit 1602 is configured to send the first information to a terminal device.

For example, coverage information of a first cell further indicates orbital plane information of a network device corresponding to the first cell.

For example, the coverage information of the $k^{th}$ cell includes coverage time information of all cells of the network device corresponding to the $k^{th}$ cell, coverage time information of an $h^{th}$ cell of the network device includes start time and end time at which the $h^{th}$ cell covers the first geographical region, $h=\{1, 2, \ldots, H\}$, and H is a quantity of the cells covered by the network device.

Alternatively, the coverage information of the $k^{th}$ cell may include the coverage time information of the $k^{th}$ cell and the coverage time information of the network device corresponding to the $k^{th}$ cell, the coverage time information of the $k^{th}$ cell includes start time and end time at which the $k^{th}$ cell covers the first geographical region, and the coverage time information of the network device includes start time and end time at which the network device covers the first geographical region.

Alternatively, the coverage information of the $k^{th}$ cell may include a moving speed and a moving direction of the network device corresponding to the $k^{th}$ cell, a coverage parameter of the $k^{th}$ cell, and a coverage parameter of the network device. The coverage parameter of the $k^{th}$ cell indicates a coverage region of the $k^{th}$ cell. The coverage parameter of the network device indicates a coverage region of the network device.

Alternatively, the coverage information of the $k^{th}$ cell includes a moving speed and a moving direction of the network device corresponding to the $k^{th}$ cell, and coverage parameters of all cells of the network device corresponding to the $k^{th}$ cell. A coverage parameter of the $h^{th}$ cell of the network device indicates a coverage region of the $h^{th}$ cell, $h=\{1, 2, \ldots, H\}$, and H is a quantity of the cells covered by the network device.

For example, the coverage parameter of the $k^{th}$ cell may include central coordinates and a coverage radius of the $k^{th}$ cell, or the coverage parameter of the $k^{th}$ cell includes central coordinates, a major axis radius, and a minor axis radius of the $k^{th}$ cell, or the coverage parameter of the $k^{th}$ cell includes a side length of the $k^{th}$ cell, or the coverage parameter of the $k^{th}$ cell includes a reference direction of the $k^{th}$ cell relative to the network device corresponding to the $k^{th}$ cell, and a maximum communicable expansion angle in the reference direction.

The coverage parameter of the network device may include central coordinates and a coverage radius of the network device, or the coverage parameter of the network device includes central coordinates, a major axis radius, and a minor axis radius of the network device, or the coverage parameter of the network device includes a side length of the network device.

For example, the coverage parameter of each cell may include central coordinates and a coverage radius of each cell, or the coverage parameter of each cell includes central coordinates, a major axis radius, and a minor axis radius of each cell, or the coverage parameter of each cell includes a side length of each cell, or the coverage parameter of each cell includes a reference direction of each cell relative to the network device corresponding to the $k^{th}$ cell, and a maximum communicable expansion angle in the reference direction.

Optionally, the transceiver unit 1602 may be specifically configured to: send H pieces of cell information to the terminal device, where each piece of cell information includes coverage information of at least one cell and information about an effective condition corresponding to the cell information, H is an integer greater than 0, and the first information is one of the H pieces of cell information.

For example, the effective condition is an effective time period.

Alternatively, the transceiver unit 1602 may be specifically configured to: send T pieces of cell information and an effective rule to the terminal device, where the effective rule indicates a rule of start effective time among the T pieces of cell information, T is an integer greater than 0, and the first information is one of the T pieces of cell information.

Division into modules in embodiments of this application is an example, is merely logical function division, and may be other division in an actual implementation. In addition, functional modules in embodiments of this application may be integrated into one processor, or each of the modules may exist alone physically, or two or more modules may be integrated into one module. The integrated module may be implemented in a form of hardware, or may be implemented in a form of a software functional module. It may be understood that, for functions or implementations of the modules in embodiments of this application, refer to related descriptions in the method embodiments.

Figure 17:
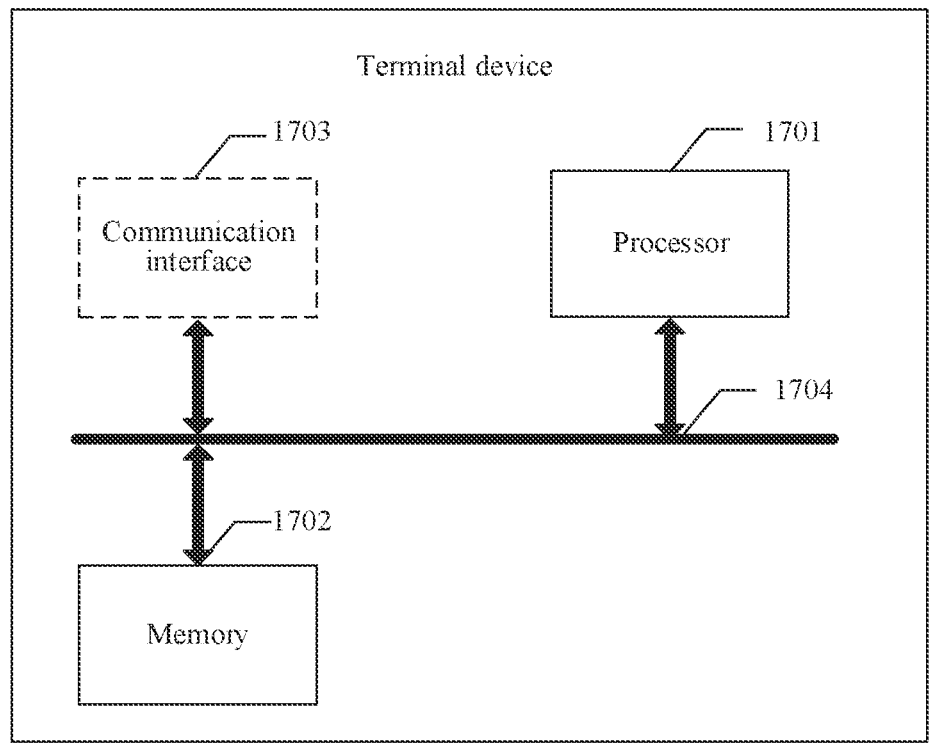
FIG. 17 is a schematic diagram of a structure of a terminal device according to an embodiment of this application.

In a possible implementation, a terminal device may be shown in FIG. 17. The terminal device may include a processor 1701 and a memory 1702, and optionally, may further include a communication interface 1703. The processing unit 1501 may be the processor 1701. The storage unit 1502 may be the memory 1702. The transceiver unit 1503 may be the communication interface 1703.

The processor 1701 may be a central processing unit (CPU), a digital processing unit, or the like. The communication interface 1703 may be a transceiver, an interface circuit such as a transceiver circuit, a transceiver chip, or the like. The memory 1702 is configured to store a program executed by the processor 1701. The memory 1702 may be a non-volatile memory, such as a hard disk drive (HDD) or a solid-state drive (SSD), or may be a volatile memory, such as a random-access memory (RAM). The memory 1702 is any other medium that can be configured to carry or store expected program code in a form of instructions or a data structure and that can be accessed by a computer, but is not limited thereto.

The processor 1701 is configured to execute the program code stored in the memory 1702, and is specifically configured to perform an action of the processing unit 1501. Details are not described herein again in this application. The communication interface 1703 is specifically configured to perform an action of the transceiver unit 1503. Details are not described herein again in this application.

A specific connection medium among the communication interface 1703, the processor 1701, and the memory 1702 is not limited in embodiments of this application. In this embodiment of this application, in FIG. 17, the memory 1702, the processor 1701, and the communication interface 1703 are connected by a bus 1704, and the bus is represented by a bold line in FIG. 17. A connection manner between other components is merely an example for description, and is not limited thereto. The bus may be classified into an address bus, a data bus, a control bus, and the like. For ease of representation, only one bold line is used to represent the bus in FIG. 17, but this does not mean that there is only one bus or only one type of bus.

Figure 18:
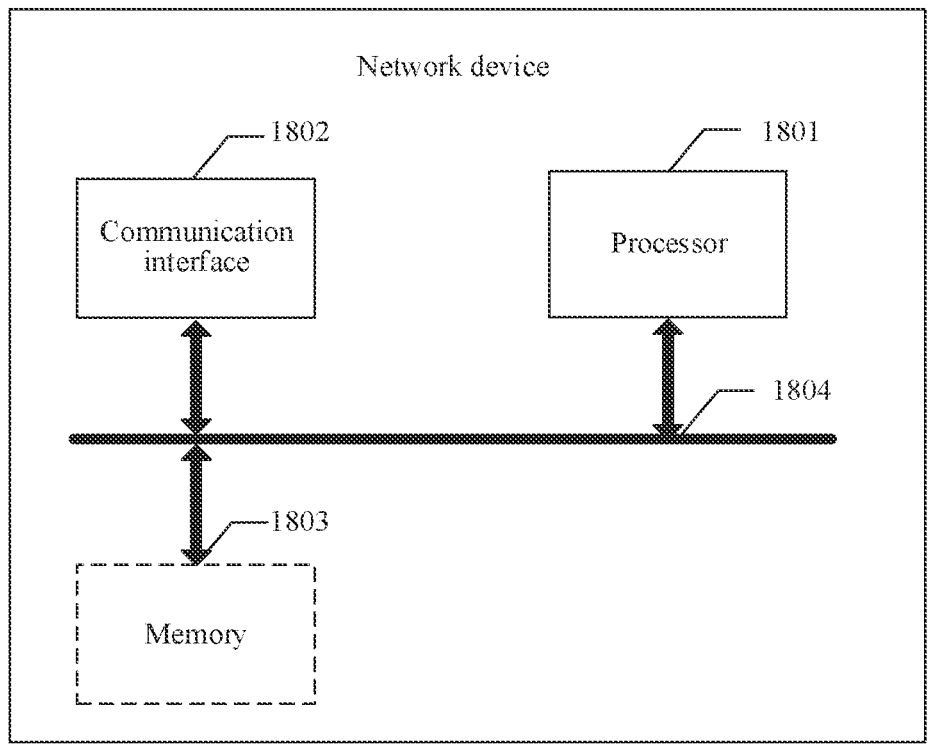
FIG. 18 is a schematic diagram of a structure of a network device according to an embodiment of this application.

In a possible implementation, a network device may be shown in FIG. 18. The apparatus may include a processor 1801 and a communication interface 1802, and may further include a memory 1803. The processing unit 1601 may be the processor 1801. The transceiver unit 1602 may be the communication interface 1802.

The processor 1801 may be a CPU, a digital processing unit, or the like. The communication interface 1802 may be a transceiver, an interface circuit such as a transceiver circuit, a transceiver chip, or the like. The apparatus further includes: the memory 1803, configured to store a program executed by the processor 1801. The memory 1803 may be a non-volatile memory, such as an HDD or an SSD, or may be a volatile memory, such as a RAM. The memory 1803 is any other medium that can be configured to carry or store expected program code in a form of instructions or a data structure and that can be accessed by a computer, but is not limited thereto.

The processor 1801 is configured to execute the program code stored in the memory 1803, and is specifically configured to perform an action of the processing unit 1601. Details are not described herein again in this application. The communication interface 1802 is specifically configured to perform an action of the transceiver unit 1602. Details are not described herein again in this application.

A specific connection medium among the communication interface 1802, the processor 1801, and the memory 1803 is not limited in embodiments of this application. In this embodiment of this application, in FIG. 18, the memory 1803, the processor 1801, and the communication interface 1802 are connected by a bus 1804, and the bus is represented by a bold line in FIG. 18. A connection manner between other components is merely an example for description, and is not limited thereto. The bus may be classified into an address bus, a data bus, a control bus, and the like. For ease of representation, only one bold line is used to represent the bus in FIG. 18, but this does not mean that there is only one bus or only one type of bus.

An embodiment of this application further provides a communication apparatus, including a processor and an interface. The processor may be configured to perform the method in the foregoing method embodiments. It should be understood that the communication apparatus may be a chip. For example, the communication apparatus may be a field programmable gate array (FPGA), an application-specific integrated circuit (ASIC), a system on chip (SoC), a CPU, a network processor (NP), a digital signal processing circuit (DSP), a micro controller (MCU), a programmable logic device (PLD), or another integrated chip.

For example, the interface may be an interface circuit. For example, the interface circuit may be a code/data read/write interface circuit. The interface circuit may be configured to receive code instructions (the code instructions are stored in a memory and can be read directly from the memory or read from the memory via another device) and transmit the code instructions to the processor. The processor may be configured to run the code instructions to perform the method in the foregoing method embodiments.

In another example, the interface circuit may alternatively be a signal transmission interface circuit between a communication processor and a transceiver. For example, in a sending scenario, the processor is configured to execute XX (XX is a non-air interface operation, including but not limited to determining, judging, processing, calculating, searching, and comparing operations) to obtain Y data. The interface circuit may be configured to send the Y data to a transmitter (the transmitter is configured to perform a sending operation on an air interface). In another example, in a receiving scenario, the interface circuit may be configured to receive Z data from a receiver (the receiver is configured to perform a receiving operation on an air interface), and send the Z data to the processor. The processor is configured to perform XX processing (XX is a non-air interface operation, including but not limited to determining, judging, processing, calculating, searching, and comparing operations) on the Z data.

Figure 19:
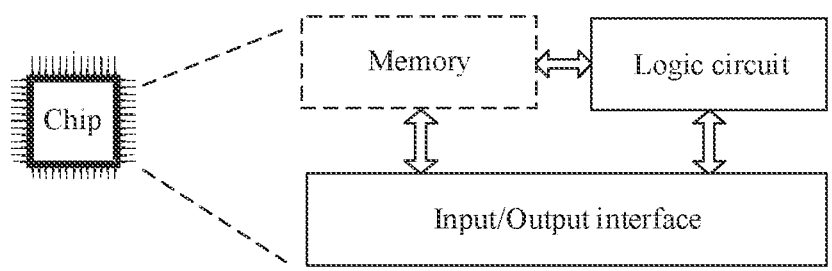
FIG. 19 is a schematic diagram of a structure of a chip according to an embodiment of this application.

For example, FIG. 19 shows a possible chip structure. The chip includes a logic circuit and an input/output interface, and may further include a memory. The input/output interface may be configured to receive code instructions (the code instructions are stored in a memory and can be read directly from the memory or read from the memory via another device) and transmit the code instructions to the logic circuit. The logic circuit may be configured to run the code instructions to perform the method in the foregoing method embodiments.

Alternatively, the input/output interface may be a signal transmission interface circuit between the logic circuit and a transceiver. For example, in a sending scenario, the logic circuit is configured to execute XX (XX is a non-air interface operation, including but not limited to determining, judging, processing, calculating, searching, and comparing operations) to obtain Y data. The input/output interface may be configured to send the Y data to a transmitter (the transmitter is configured to perform a sending operation on an air interface). In another example, in a receiving scenario, the input/output interface may be configured to receive Z data from a receiver (the receiver is configured to perform a receiving operation on an air interface), and send the Z data to the logic circuit. The logic circuit is configured to perform XX processing (XX is a non-air interface operation, including but not limited to determining, judging, processing, calculating, searching, and comparing operations) on the Z data.

An embodiment of the present invention further provides a computer-readable storage medium, configured to store computer software instructions that need to be executed by the foregoing processor, and the computer-readable storage medium includes a program that needs to be executed by the foregoing processor.

A person skilled in the art should understand that embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of another programmable data processing device to generate a machine, so that the instructions executed by a computer or the processor of another programmable data processing device generate an apparatus for implementing a specific function in one or more processes in the flowcharts and/or in one or more blocks in the block diagrams.

These computer program instructions may be stored in a computer-readable memory that can instruct the computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operation steps are performed on the computer or another programmable device, to generate computer-implemented processing. Therefore, the instructions executed on the computer or another programmable device provide steps for implementing a specific function in one or more processes in the flowcharts and/or in one or more blocks in the block diagrams.

It is clearly that a person skilled in the art can make various modifications and variations to this application without departing from the spirit and scope of this application. This application is intended to cover these modifications and variations of this application provided that they fall within the scope of the claims and their equivalent technologies.

What is claimed is:

1. A method, comprising:
    performing, by a terminal device, measurement based on measurement configuration information of N cells, wherein N is an integer greater than 0;
    determining, by the terminal device, M candidate cells based on a measurement result, wherein M is an integer greater than 0 and less than N; and
    selecting, by the terminal device, a target cell from the M candidate cells based on first information, wherein the first information comprises coverage information of at least one candidate cell in the M candidate cells, coverage information of an $i^{th}$ candidate cell in the at least one candidate cell comprises coverage time information of the $i^{th}$ candidate cell covering a first geographical region and coverage time information of a network device corresponding to the $i^{th}$ candidate cell covering the first geographical region, the terminal device is located in the first geographical region, i={1, 2, . . . , I}, and I is a quantity of the at least one candidate cell.

2. The method according to claim 1, wherein the selecting, by the terminal device, a target cell from the M candidate cells based on first information comprises:
    for each candidate cell in the at least one candidate cell:
        determining, by the terminal device, remaining coverage duration of the candidate cell based on coverage time information of the candidate cell covering the first geographical region;
        determining remaining coverage duration of a network device corresponding to the candidate cell based on coverage time information of the network device corresponding to the candidate cell covering the first geographical region; and
        determining, by the terminal device, a metric value of the candidate cell based on the remaining coverage duration of the candidate cell and the remaining coverage duration of the network device corresponding to the candidate cell, wherein the metric value of the candidate cell indicates time in which the network device corresponding to the candidate cell serves the terminal device; and
    determining, by the terminal device, the target cell based on the metric value of each candidate cell.

3. The method according to claim 2, wherein the metric value of the candidate cell is a weighted sum of the remaining coverage duration of the candidate cell and the remaining coverage duration of the network device corresponding to the candidate cell.

4. The method according to claim 3, wherein in response to determining that the network device corresponding to the candidate cell and a network device corresponding to a serving cell of the terminal device are on a same orbital plane, the metric value of the candidate cell is determined by using a first weighting scheme; or
    in response to determining that the network device corresponding to the candidate cell and a network device corresponding to a serving cell of the terminal device are on different orbital planes, the metric value of the candidate cell is determined by using a second weighting scheme, wherein:
the first weighting scheme satisfies at least one of the following conditions: a weighted value of remaining coverage duration of a cell in the first weighting scheme is not less than a weighted value of the remaining coverage duration of the cell in the second weighting scheme, and a weighted value of remaining coverage duration of a network device corresponding to the cell in the first weighting scheme is not less than a weighted value of the remaining coverage duration of the network device corresponding to the cell in the second weighted scheme.

5. The method according to claim 4, wherein the coverage information of the $i^{th}$ candidate cell comprises orbital plane information of the network device corresponding to the $i^{th}$ candidate cell.

6. The method according to claim 1, wherein the coverage information of the $i^{th}$ candidate cell comprises coverage time information of all cells of the network device corresponding to the $i^{th}$ candidate cell, coverage time information of a $j^{th}$ cell of the network device comprises start time and end time at which the $j^{th}$ cell covers the first geographical region, $j=\{1, 2, \ldots, J\}$, and J is a quantity of the cells of the network device; or
the coverage information of the $i^{th}$ candidate cell comprises the coverage time information of the $i^{th}$ candidate cell and the coverage time information of the network device corresponding to the $i^{th}$ candidate cell, the coverage time information of the $i^{th}$ candidate cell comprises start time and end time at which the $i^{th}$ candidate cell covers the first geographical region, and the coverage time information of the network device comprises start time and end time at which the network device covers the first geographical region; or
the coverage information of the $i^{th}$ candidate cell comprises a moving speed and a moving direction of the network device corresponding to the $i^{th}$ candidate cell, a coverage parameter of the $i^{th}$ candidate cell, and a coverage parameter of the network device, wherein the coverage parameter of the $i^{th}$ candidate cell indicates a coverage region of the $i^{th}$ candidate cell, and the coverage parameter of the network device indicates a coverage region of the network device; or
the coverage information of the $i^{th}$ candidate cell comprises a moving speed and a moving direction of the network device corresponding to the $i^{th}$ candidate cell, and coverage parameters of all cells of the network device corresponding to the $i^{th}$ candidate cell, wherein a coverage parameter of a $j^{th}$ cell of the network device indicates a coverage region of the $j^{th}$ cell, $j=\{1, 2, \ldots, J\}$, and J is a quantity of the cells of the network device.

7. The method according to claim 6, wherein the coverage parameter of the $i^{th}$ candidate cell comprises central coordinates and a coverage radius of the $i^{th}$ candidate cell, or the coverage parameter of the $i^{th}$ candidate cell comprises central coordinates, a major axis radius, and a minor axis radius of the $i^{th}$ candidate cell, or the coverage parameter of the $i^{th}$ candidate cell comprises a side length of the $i^{th}$ candidate cell, or the coverage parameter of the $i^{th}$ candidate cell comprises a reference direction of the $i^{th}$ candidate cell relative to the network device corresponding to the $i^{th}$ candidate cell and a maximum communicable expansion angle in the reference direction; and the coverage parameter of the network device comprises central coordinates and a coverage radius of the network device, or the coverage parameter of the network device comprises central coordinates, a major axis radius, and a minor axis radius of the network device, or the coverage parameter of the network device comprises a side length of the network device.

8. The method according to claim 6, wherein the coverage parameter of the $j^{th}$ cell comprises central coordinates and a coverage radius of the $j^{th}$ cell, or the coverage parameter of the $j^{th}$ cell comprises central coordinates, a major axis radius, and a minor axis radius of the $j^{th}$ cell, or the coverage parameter of the $j^{th}$ cell comprises a side length of the $j^{th}$ cell, or the coverage parameter of the $j^{th}$ cell comprises a reference direction of the $j^{th}$ cell relative to the network device corresponding to the $i^{th}$ candidate cell and a maximum communicable expansion angle in the reference direction.

9. The method according to claim 1, wherein before the performing, by a terminal device, measurement based on measurement configuration information of N cells, the method further comprises:
receiving, by the terminal device, the first information from a serving cell of the terminal device.

10. The method according to claim 1, wherein after the determining, by the terminal device, M candidate cells based on a measurement result, the method further comprises:
receiving, by the terminal device, the first information from the $i^{th}$ candidate cell in the at least one candidate cell.

11. The method according to claim 1, wherein before the performing, by a terminal device, measurement based on measurement configuration information of N cells, the method further comprises:
receiving, by the terminal device, H pieces of cell information from a serving cell of the terminal device, wherein each piece of cell information comprises coverage information of at least one cell and information about an effective condition corresponding to the cell information, and H is an integer greater than 0; and
selecting, by the terminal device, to-be-used cell information based on information about effective conditions of the H pieces of cell information, wherein the cell information comprises the first information.

12. The method according to claim 11, wherein the effective condition is an effective time period.

13. The method according to claim 1, wherein before the performing, by a terminal device, measurement based on measurement configuration information of N cells, the method further comprises:
receiving, by the terminal device, T pieces of cell information and an effective rule from a serving cell of the terminal device, wherein the effective rule indicates a rule of start effective time among the T pieces of cell information, and T is an integer greater than 0;
determining, by the terminal device, the start effective time of the T pieces of cell information based on the effective rule; and
selecting, by the terminal device, to-be-used cell information based on the start effective time of the T pieces of cell information, wherein the cell information comprises the first information.

14. An apparatus, comprising at least one processor and at least one memory coupled to the at least one processor, the at least one memory storing programming instructions for execution by the at least one processor to cause the apparatus to perform operations comprising:

performing measurement based on measurement configuration information of N cells, wherein N is an integer greater than 0;
determining M candidate cells based on a measurement result, wherein M is an integer greater than 0 and less than N; and
selecting a target cell from the M candidate cells based on first information, wherein the first information comprises coverage information of at least one candidate cell in the M candidate cells, coverage information of an $i^{th}$ candidate cell in the M candidate cells comprises coverage time information of the $i^{th}$ candidate cell covering a first geographical region and coverage time information of a network device corresponding to the $i^{th}$ candidate cell covering the first geographical region, the apparatus is located in the first geographical region, i={1, 2, . . . , I}, and I is a quantity of the at least one candidate cell.

15. The apparatus according to claim 14, wherein the selecting the target cell from the M candidate cells based on the first information comprises:
for each candidate cell in the at least one candidate cell:
determining remaining coverage duration of the candidate cell based on coverage time information of the candidate cell covering the first geographical region;
determining remaining coverage duration of a network device corresponding to the candidate cell based on coverage time information of the network device corresponding to the candidate cell covering the first geographical region; and
determining a metric value of the candidate cell based on the remaining coverage duration of the candidate cell and the remaining coverage duration of the network device corresponding to the candidate cell, wherein the metric value of the candidate cell indicates time in which the network device corresponding to the candidate cell serves the apparatus; and
determining the target cell based on the metric value of the at least one candidate cell.

16. The apparatus according to claim 15, wherein the metric value of the candidate cell is a weighted sum of the remaining coverage duration of the candidate cell and the remaining coverage duration of the network device corresponding to the candidate cell.

17. The apparatus according to claim 16, wherein in response to determining that the network device corresponding to the candidate cell and a network device corresponding to a serving cell of the apparatus are on a same orbital plane, the metric value of the candidate cell is determined by using a first weighting scheme; or
in response to determining that the network device corresponding to the candidate cell and the network device corresponding to the serving cell of the apparatus are on different orbital planes, the metric value of the candidate cell is determined by using a second weighting scheme, wherein:
the first weighting scheme satisfies at least one of the following conditions: a weighted value of remaining coverage duration of a cell in the first weighting scheme is greater than a weighted value of the remaining coverage duration of the cell in the second weighting scheme, and a weighted value of remaining coverage duration of a network device corresponding to the cell in the first weighting scheme is greater than a weighted value of the remaining coverage duration of the network device corresponding to the cell in the second weighted scheme.

18. The apparatus according to claim 17, wherein the coverage information of the $i^{th}$ candidate cell comprises orbital plane information of the network device corresponding to the $i^{th}$ candidate cell.

19. The apparatus according to claim 14, wherein the coverage information of the $i^{th}$ candidate cell comprises coverage time information of each cell of the network device corresponding to the $i^{th}$ candidate cell, and the coverage time information of each cell comprises start time and end time at which each cell covers the first geographical region; or
the coverage information of the $i^{th}$ candidate cell comprises the coverage time information of the $i^{th}$ candidate cell and the coverage time information of the network device corresponding to the $i^{th}$ candidate cell, the coverage time information of the $i^{th}$ candidate cell comprises start time and end time at which the $i^{th}$ candidate cell covers the first geographical region, and the coverage time information of the network device comprises start time and end time at which the network device covers the first geographical region; or
the coverage information of the $i^{th}$ candidate cell comprises a moving speed and a moving direction of the network device corresponding to the $i^{th}$ candidate cell, a coverage parameter of the $i^{th}$ candidate cell, and a coverage parameter of the network device, wherein the coverage parameter of the $i^{th}$ candidate cell indicates a coverage region of the $i^{th}$ candidate cell, and the coverage parameter of the network device indicates a coverage region of the network device; or
the coverage information of the $i^{th}$ candidate cell comprises a moving speed and a moving direction of the network device corresponding to the $i^{th}$ candidate cell, and a coverage parameter of each cell of the network device corresponding to the $i^{th}$ candidate cell, wherein the coverage parameter of each cell indicates a coverage region of each cell.

20. A non-transitory computer-readable storage medium, wherein the non-transitory computer-readable storage medium comprises programming instructions for execution by at least one processor of an apparatus to cause the apparatus to perform operations comprising:
performing measurement based on measurement configuration information of N cells, wherein N is an integer greater than 0;
determining M candidate cells based on a measurement result, wherein M is an integer greater than 0 and less than N; and
selecting a target cell from the M candidate cells based on first information, wherein the first information comprises coverage information of at least one candidate cell in the M candidate cells, coverage information of an $i^{th}$ candidate cell in the M candidate cells comprises coverage time information of the $i^{th}$ candidate cell covering a first geographical region and coverage time information of a network device corresponding to the $i^{th}$ candidate cell covering the first geographical region, the apparatus is located in the first geographical region, i={1, 2, . . . , I}, and I is a quantity of the at least one candidate cell.

* * * * *